(12) United States Patent
Sashihara et al.

(10) Patent No.: US 7,116,935 B2
(45) Date of Patent: Oct. 3, 2006

(54) WIRELESS NETWORK SYSTEM AND NETWORK ADDRESS ASSIGNING METHOD

(75) Inventors: Toshiyuki Sashihara, Tokyo (JP); Takahiro Furuuchi, Tokyo (JP)

(73) Assignee: NEC Corporation, (JP)

( * ) Notice: Subject to any disclaimer, the term of this patent is extended or adjusted under 35 U.S.C. 154(b) by 743 days.

(21) Appl. No.: 09/976,562

(22) Filed: Oct. 12, 2001

(65) Prior Publication Data

US 2002/0045423 A1 Apr. 18, 2002

(30) Foreign Application Priority Data

Oct. 13, 2000 (JP) .............................. 2000-313584

(51) Int. Cl.
*H04B 7/15* (2006.01)
(52) U.S. Cl. ..................... 455/11.1; 455/551; 455/519; 455/7; 455/8
(58) Field of Classification Search ............... 455/11.1, 455/13.1, 16, 403, 560, 561, 551, 524, 424, 455/525, 435.1, 433, 439, 7, 8, 519; 709/238; 370/352, 235, 236, 256, 355, 356, 395.3, 370/392, 393, 400, 382, 395.31, 408, 409, 370/475
See application file for complete search history.

(56) References Cited

U.S. PATENT DOCUMENTS 5,946,633 A * 8/1999 McAlinden ................. 455/551

6,792,474 B1 * 9/2004 Hopprich et al. ........... 709/245

FOREIGN PATENT DOCUMENTS

| JP | 2-309732 | 12/1990 |
|---|---|---|
| JP | 11-55317 | 2/1999 |

OTHER PUBLICATIONS

Japanese Office Action issued Mar. 27, 2003 (w/ English translation of relevant portion).

* cited by examiner

*Primary Examiner*—Jefferey F. Harold
(74) *Attorney, Agent, or Firm*—Dickstein, Shapiro, LLP.

(57) ABSTRACT

A wireless network system and a network address assigning method are provided which are capable of reducing traffic occurring when an network address is assigned to each of communication units making up a tree-structure-type wireless network system.

The wireless network system includes a radio-relay station, a radio-relay station connected to the radio-relay station and to another radio-relay station in a wireless manner. The radio-relay station preserves a plurality of network addresses to be assigned to these radio-relay stations, assigns a first network address belonging to the plurality of network addresses to one radio-relay station and an address pool making up the plurality of network addresses collectively to the other radio-relay station. The above radio-relay station preserves the address pool and assigns a second network address belonging to the address pool to a wireless terminal. The radio-relay station does not assign directly the network address to the wireless terminal.

9 Claims, 18 Drawing Sheets

34; participation request message

30; wireless control signal message

34; participation request message

38; participation acknowledging message

50; address acquiring request message

54; address assigning notification message

FIG. 7

| message code | communication unit ID | requested address |
|---|---|---|
| 61 | 62 | 63 |

60; address assigning refusing message

FIG. 8

| message code | communication unit ID | number of requested addresses | head address of acquired pool |
|---|---|---|---|
| 71 | 72 | 73 | 74 |

70; address pool acquiring request message

FIG. 9

| message code | communication unit ID | number of assigned addresses | head address of assigned pool | assigned period |
|---|---|---|---|---|
| 76 | 77 | 78 | 79 | 80 |

75; address pool assigning notification message

FIG. 10

| message code | communication unit ID | head address of requested pool |
|---|---|---|
| 82 | 83 | 84 |

81; address pool assigning refusing message

WIRELESS NETWORK SYSTEM AND NETWORK ADDRESS ASSIGNING METHOD

BACKGROUND OF THE INVENTION

1. Field of the Invention

The present invention relates to a wireless network system and a network address assigning method and more particularly to the wireless network system and network address assigning method capable of automatically assigning a network address to each of communication units making up a tree- structure-type wireless network system. The present application claims priority of Japanese Patent Application No. 2000-313584 filed on Oct. 13, 2000, which is hereby incorporated by reference.

2. Description of the Related Art

A wireless network system is known in which a plurality of communication units are connected with each other in a wireless manner. In such the wireless network system, a network address determined uniquely in a network is assigned to each of the communication units. When the communication units carry out communications with each other in the network, the communication unit to be operated as a destination unit is identified by the network address.

FIG. 25 shows a known wireless network system in which a plurality of communication units is connected, in a wireless manner, to carry out communications among child terminals of PHSs (Personal Handyphone Systems). As shown in FIG. 2b, a plurality of the communication units is made up of a radio-relay terminating station 101, radio-relay stations 102-1 to 102-5, and wireless terminals 103-1 to 103-4.

The radio-relay terminating station 101 is connected to the radio-relay station 102-1 and to the radio-relay station 102-2. The radio-relay station 102-1 is connected to the radio-relay station 102-3 and to the radio-relay station 102-4. The radio-relay station 102-2 is connected to the radio-relay station 102-5. The radio-relay station 102-3 is connected to the wireless terminal 103-1 and to the wireless terminal 103-2. The radio-relay station 102-4 is connected to the wireless terminal 103-3. The radio-relay station 102-5 is connected to the wireless terminal 103-4.

Such the wireless network system is regarded as a graph in which each of a plurality of the communication units serves as a node and each of connection relations among them serves as a side. The graph is constructed so as to be of a tree structure and a path to connect the radio-relay terminating station 101 to one of the wireless terminal 103-j (j=1,2,3, and 4) is determined uniquely. Of the communication units connected on the path, each of the radio-relay station 102-i (i=1,2) existing on a side of the radio-relay terminating station 101 is defined as a parent station of each of the radio-relay stations 102-i (i=3,4 and 5) and each of the radio-relay station 102-i (i=3,4 and 5) being connected to each of the parent stations is defined as a child station. Of the communication units connected on the path, each of the wireless terminals 103-j existing on the side of the radio-relay terminating station 101 is defined as a parent station of each of the wireless terminals 103-j and each of the wireless terminals 103-j being connected to each or the parent stations is defined as a child station of each of the defined parent stations.

At this point, the wireless terminals 103-j are always child stations of the radio-relay stations 102-i. Each of the radio-relay stations 102-i is the child station of the radio-relay terminating station 101 or each of the radio-relay stations 102-i'(i'≠i) and is the parent station of the radio-relay station 102-i"(i"≠i) or each of the wireless terminals 103-j. The radio-relay terminating station 101 is always the parent station of the radio-relay station 102-i. Though, in the example shown in FIG. 25, the radio-relay terminating station 101 is connected indirectly through the radio-relay station 102-i to the wireless terminal 103-j, the radio-relay terminating station 101 may be connected directly to the wireless terminals 103-j.

For example, the radio-relay terminating station 101 is the parent station of the radio-relay station 102-1 and the radio-relay station 102-1 is the child station of the radio-relay terminating station 101. The radio-relay station 102-1 is the parent station of the radio-relay station 102-3 and the radio-relay station 102-3 is the child station of the radio-relay station 102-1. The radio-relay station 102-3 is the parent station of the wireless terminal 103-1 and the wireless terminal 103-1 is the child station of the radio-relay station 102-3.

The radio-relay terminating station 101 manages data received from the child station in a unified way and transmits data addressed to each of the wireless terminals 103-j to each of the wireless terminals 103-j. The radio-relay terminating station 101, when being not connected directly to the wireless terminals 103-j being a destination unit, hunts any child station (radio-relay station 102-i) being connected to the wireless terminal 103-j and transfers the data to the hunted child station (the radio-relay station 102-i).

The radio-relay station 102-i transfers data received from the child station to the parent station and transmits data addressed to the wireless terminal to the wireless terminal. The radio-relay station 102-i, when being not connected directly to the wireless terminal 103-j being the destination unit, hunts any child station (that is, the radio-relay station 102-i') being connected to the wireless terminal 103-j and transfers data to the child station (that is, to the radio-relay station 102-i'). The wireless terminal 103-j is movable and, by being the child station of the radio-relay station 102-i or the radio-relay terminating station 101, transmits data to the radio-relay terminating station 101 and receives data addressed to the wireless terminal 103-j.

In the above wireless network system, the radio-relay terminating station 101 has a function of a DHCP (Dynamic Host Configuration Protocol) server as disclosed in Japanese Patent Application Laid-open No. Hei 11-55317 and each of a plurality of communication units in the wireless network system, by carrying out communications with the radio-relay terminating station 101, acquires a network address. At this point, the wireless terminal 103-j, when moving, can change its parent station and the radio-relay terminating station 101, every time the wireless terminal 103-j moves and changes its parent station, reassigns the network address to the wireless terminal 103-j that has moved and changed its parent station.

In that case, communication data gathers in a concentrated manner to the radio-relay station 102-i existing near to the radio-relay terminating unit, which causes traffic in the wireless network system to increase and data transmission efficiency in the entire wireless network system to be reduced. Moreover, when the number of the radio-relay station 102-i to connect the communication unit requesting for the network address with the radio-relay terminating station 101 becomes larger, time required for the relay of data increases more, thus the time necessary to assign the network address increases.

If each of the radio-relay stations 102-i is provided with the function of the DHCP server, it is necessary to assign two or more network addresses for every radio-relay station 102-i. Because of this, when the number of the radio-relay station 102-i becomes larger, work in which the radio-relay terminating station 101 assigns the network address to each of the radio-relay station 102-i increases more.

SUMMARY OF THE INVENTION

In view of the above, it is an object of the present invention to provide a wireless network system and a network address assigning method capable of reducing traffic occurring when a network address is assigned to each of communication units making up a tree-structure-type wireless network system. It is another object of the present invention to provide the wireless network system and the network address assigning method capable of achieving easy assignment of the network address. It is still another object of the present invention to provide the wireless network system and the network address assigning method capable of achieving easy assignment of the network address even when relations of connections among the wireless network systems have been changed. It is still another object of the present invention to provide the wireless network system and the network address assigning method capable of achieving easy assignment of the network address even when connection of a communication unit making up the wireless network system moves to another wireless network.

According to a fist aspect of the present invention, there is provided a wireless network system including:

a radio-relay terminating station;

a radio-relay station being connected to the radio-relay terminating station in a wireless manner;

a wireless terminal being connected to the radio-relay station in a wireless manner; and wherein the radio-relay terminating station preserves a plurality of network addresses to be assigned to the radio-relay station and to the wireless terminal, assigns a first network address belonging to the plurality of network addresses to the radio-relay station and collectively feeds an address pool making up a part of the plurality of network addresses to the radio-relay station and wherein the radio-relay station preserves the address pool and assigns a second network address belonging to the address pool to the wireless terminal.

In the above aspect, the radio-relay station may be connected through another radio-relay station to the radio-relay terminating station. The radio-relay terminating station does not directly assign the network address to the radio-relay station. This serves to prevent an increase in traffic in the wireless network system.

In the foregoing, a preferable mode is one that wherein includes an other radio-relay station, wherein the other radio-relay station preserves an other address pool being different from the address pool and wherein, when the radio-relay station is connected to the other radio-relay station, the other radio-relay station assigns a third network address belonging to the other address pool to the radio-relay station.

In the above aspect, if the radio-relay station is disconnected to the radio-relay terminating station, the radio-relay station is connected to an other radio-relay station. With the above configuration, since the radio-relay terminating station does not assign directly the network address to the radio-relay station, the traffic in the wireless network system does not increase.

Also, a preferable mode is one wherein the other radio-relay station is connected to the radio-relay terminating station, the other address pool makes up of a part of the plurality of network addresses and the address pool is not renewed and the second network address is not renewed.

With the above configuration, the traffic in the wireless network system does not increase.

Also, a preferable mode is one that wherein includes an other radio-relay terminating station which preserves an other plurality of network addresses being different from the plurality of network addresses, and wherein, when the other radio-relay station is connected to the other radio-relay terminating station, the address pool is renewed to become still an other address pool making up a part of the plurality of the other network addresses and the second network address is renewed to become a fourth network address belonging to the other address pool.

In the above aspect, the wireless network constructed for every radio-relay terminating station. It is preferable that, only when the other radio-relay station is system is connected to an other wireless network system, the address pool is renewed and the network address of the child station of the radio-relay station is renewed.

According to a second aspect of the present invention, there is provided a network address assigning method for assigning a network address to a radio-relay station and a wireless terminal in a wireless network system made up of a radio-relay terminating station, the radio-relay station, and the wireless terminal, the method including:

a step of feeding a plurality of network addresses to the radio-relay terminating station;

a step of assigning a first network address belonging to the plurality of network addresses to the radio-relay station being connected to the radio-relay terminating station in a wireless manner;

a step of notifying the radio-relay station being connected to the radio-relay terminating station in the wireless manner of an address pool making up a part of the plurality of network addresses; and a step of assigning a second network address belonging to the address pool to the wireless terminal being connected to the radio-relay station in a wireless manner.

In the above aspect, the radio-relay terminating station does not assign directly the network address to the radio-relay station. This thus serves to prevent an increase in traffic in the wireless network system.

In the foregoing, a preferable mode is one wherein the wireless network system includes an other radio-relay station having an other address pool being different from the address pool and wherein, the radio-relay station is connected to the other radio-relay station, a third network address belonging to the other address pool is assigned to the radio-relay station.

In the above aspect, the radio-relay terminating station does not directly assign the network address to the radio-relay station. This serves to prevent the increase in the traffic in the wireless network system.

Also, a preferable mode is one wherein, when the other radio-relay station is connected to the radio-relay terminating station, the other address pool makes up the plurality of network addresses and the address pool is not renewed and the third network address is not renewed.

With the above configuration, the traffic in the wireless network system does not increase.

Also, a preferable mode is one wherein the wireless network system includes an other radio-relay terminating station and wherein, when the other radio-relay station is connected to the other radio-relay terminating station, the network address assigning method comprises:

a step of feeding plurality of network addresses being different from the an other plurality of network addresses to the other radio-relay terminating station;

a step of notifying the other radio-relay station of the other address pool making up a part of the other plurality of network addresses;

a step of notifying the radio-relay station of still an other address pool making up a part of a plurality of other network addresses; and a step of assigning a fourth network address belonging to still an other address pool to the wireless terminal.

In the above aspect, the wireless network system is constructed for every radio-relay terminating station. It is preferable that, only when-the radio-relay station is connected to an other wireless network system, the address pool that the radio-relay station has is renewed and the network address of the child station of the radio-relay station is renewed.

Furthermore, a preferable mode is one wherein each of the plurality of network addresses contains a value corresponding to the radio-relay terminating station and wherein, when the value belonging to the first network address is different from the value belonging to the third network address, still other address pool is notified.

In the above mode, whether the connection of the radio-relay station has moved to an other wireless network system is judged based on the network address assigned to the radio-relay station and, when the connection of the radio-relay station is judged to have moved, the radio-relay station instructs the radio-relay terminating station to get the address pool.

With the above configurations, the network address can be automatically assigned to each of communication devices making up a tree-structure-type wireless network system without increases in the traffic in the network system.

BRIEF DESCRIPTION OF THE DRAWINGS

The above and other objects, advantages, and features of the present invention will be more apparent from the following description taken in conjunction with the accompanying drawings in which:

FIG. 7 shows a data structure of an address assigning refusing message employed in the wireless network system according to the embodiment of the present invention;

FIG. 8 shows a data structure of an address pool acquiring request message employed in the wireless network system according to the embodiment of the present invention;

FIG. 9 shows a data structure of an address pool assigning notification message employed in the wireless network system according to the embodiment of the present invention;

FIG. 10 shows a data structure of an address assigning refusing message employed in the wireless network system according to the embodiment of the present invention;

DETAILED DESCRIPTION OF THE PREFERRED EMBODIMENTS

Best modes of carrying out the present invention will he described in further detail using various embodiments with reference to the accompanying drawings.

Embodiment

Figure 1:
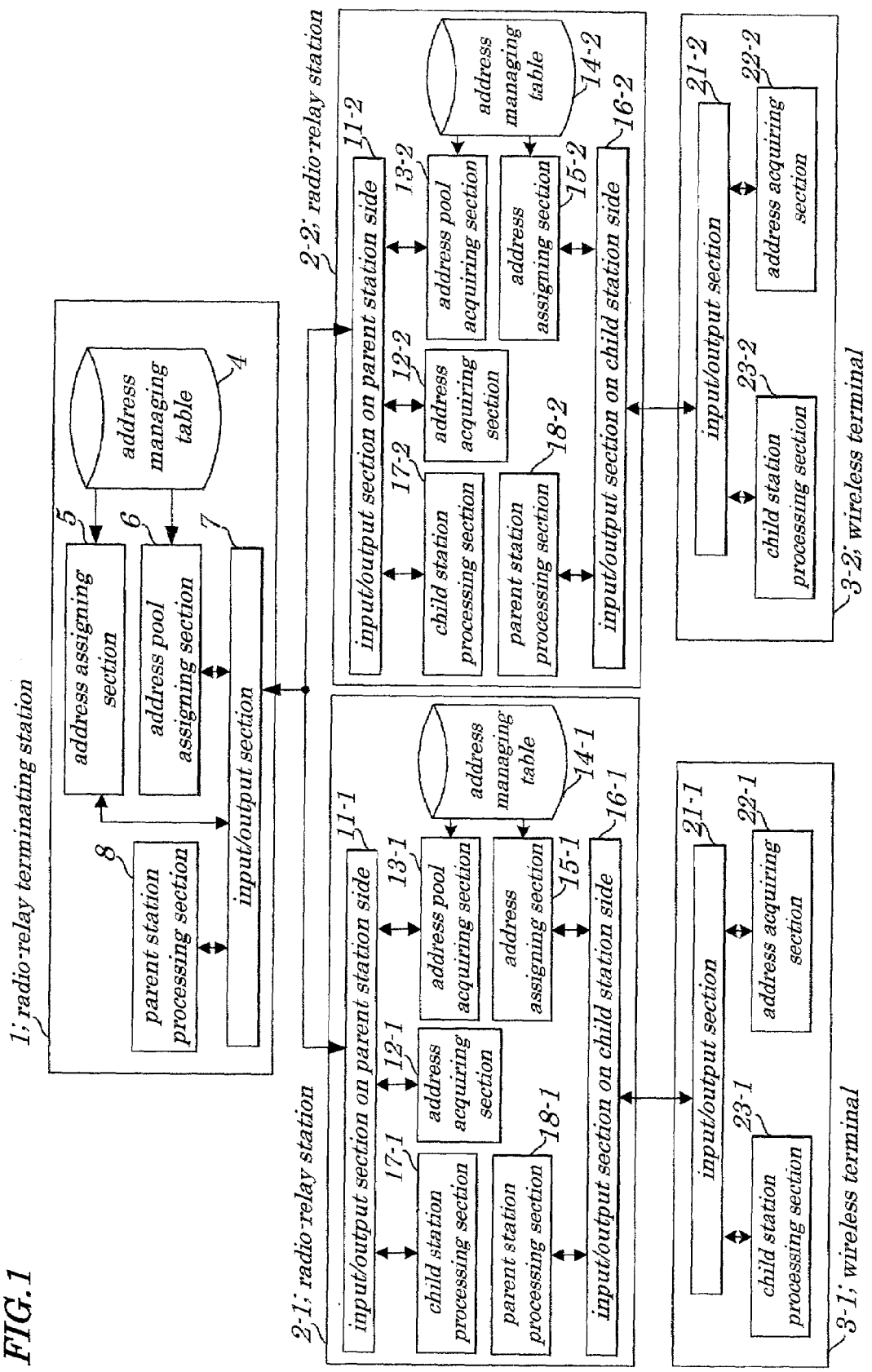
FIG. 1 is a schematic block diagram showing a wireless network system of an embodiment of the present invention.

FIG. 1 is a schematic block diagram showing a wireless network system of an embodiment of the present invention. In the embodiment, a plurality of communication units is connected in a wireless manner to carry out communications between child terminals of PHSs. As shown in FIG. 1, the wireless network system includes a radio-relay terminating station 1, radio-relay stations 2-1 and 2-2, and wireless terminals 3-1 and 3-2. The radio-relay terminating station 1 is connected to the radio-relay station 2-1 and to the radio-relay 2-2. The radio-relay station 2-1 is connected to the wireless terminal 3-1. The radio-relay station 2-2 is connected to the wireless terminal 3-2.

Such the wireless network system can be compared to a graph in which each of the plurality of communication units serves as a node and each of connection relations serves as a side. The graph is so constructed as to be of a tree structure and a path to connect the radio-relay terminating station 1 to wireless terminal 3-j (j=1, 2, . . . ) is determined uniquely. Of the communication units connected on the path, the communication unit being connected directly to one of communication units 2-i (i=1, 2, . . . ) and existing on a side of the radio-relay terminating station 1 is defined as a parent station of each of the radio-relay stations 2-i and each of the radio-relay stations 2-i is defined as a child station of the parent station. Of the communication units being connected on the path, the communication unit being connected directly to one of the wireless terminations 3-j and existing on the side of the radio-relay terminating station 1 is defined as a parent station of the wireless terminals 3-j and each of the wireless terminals 3-j is defined as a child station of the parent station.

Figure 15:
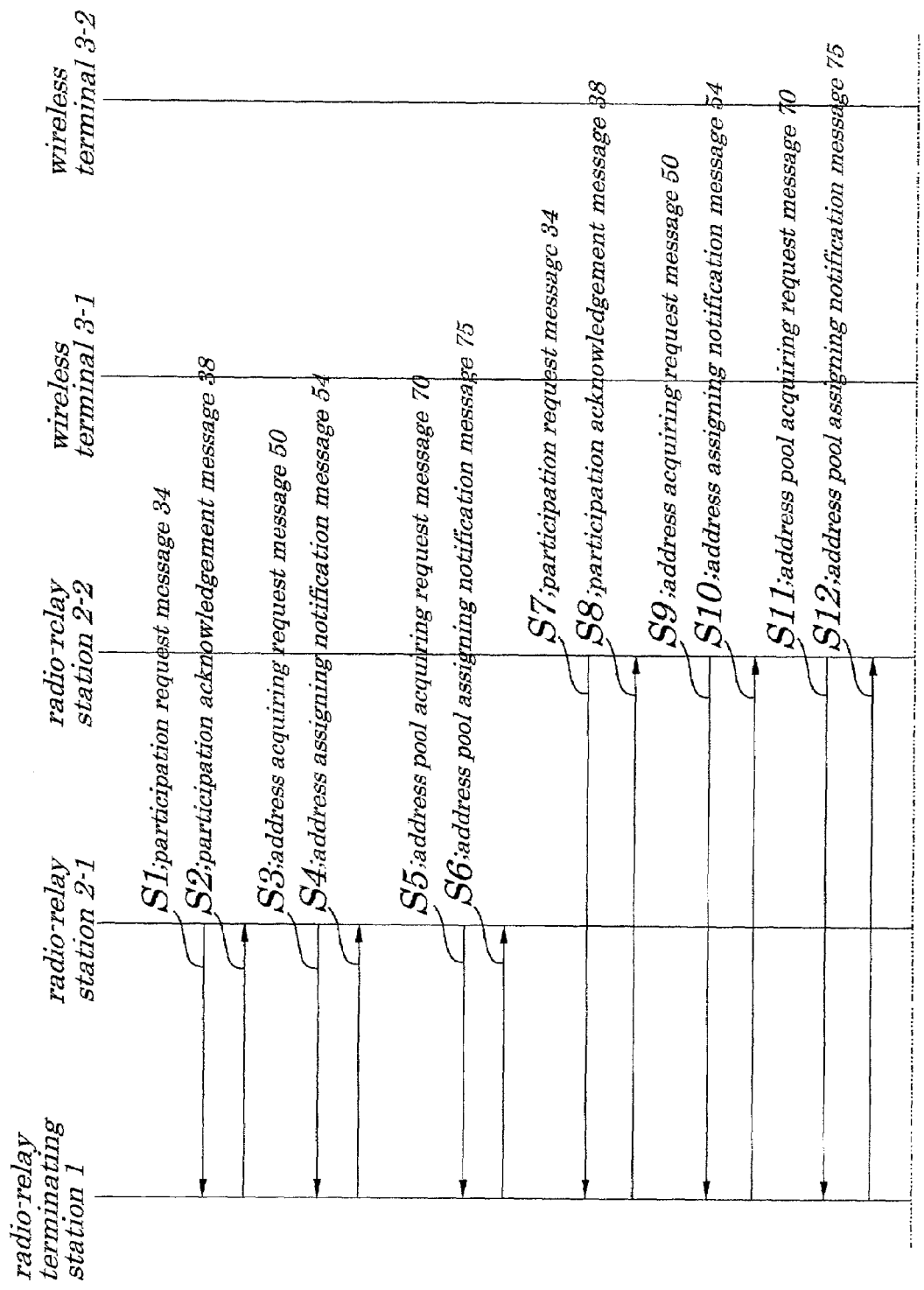
FIG. 15 is a diagram showing sequences of operations required to newly construct a wireless network system according to the embodiment of the present invention.
Figure 16:
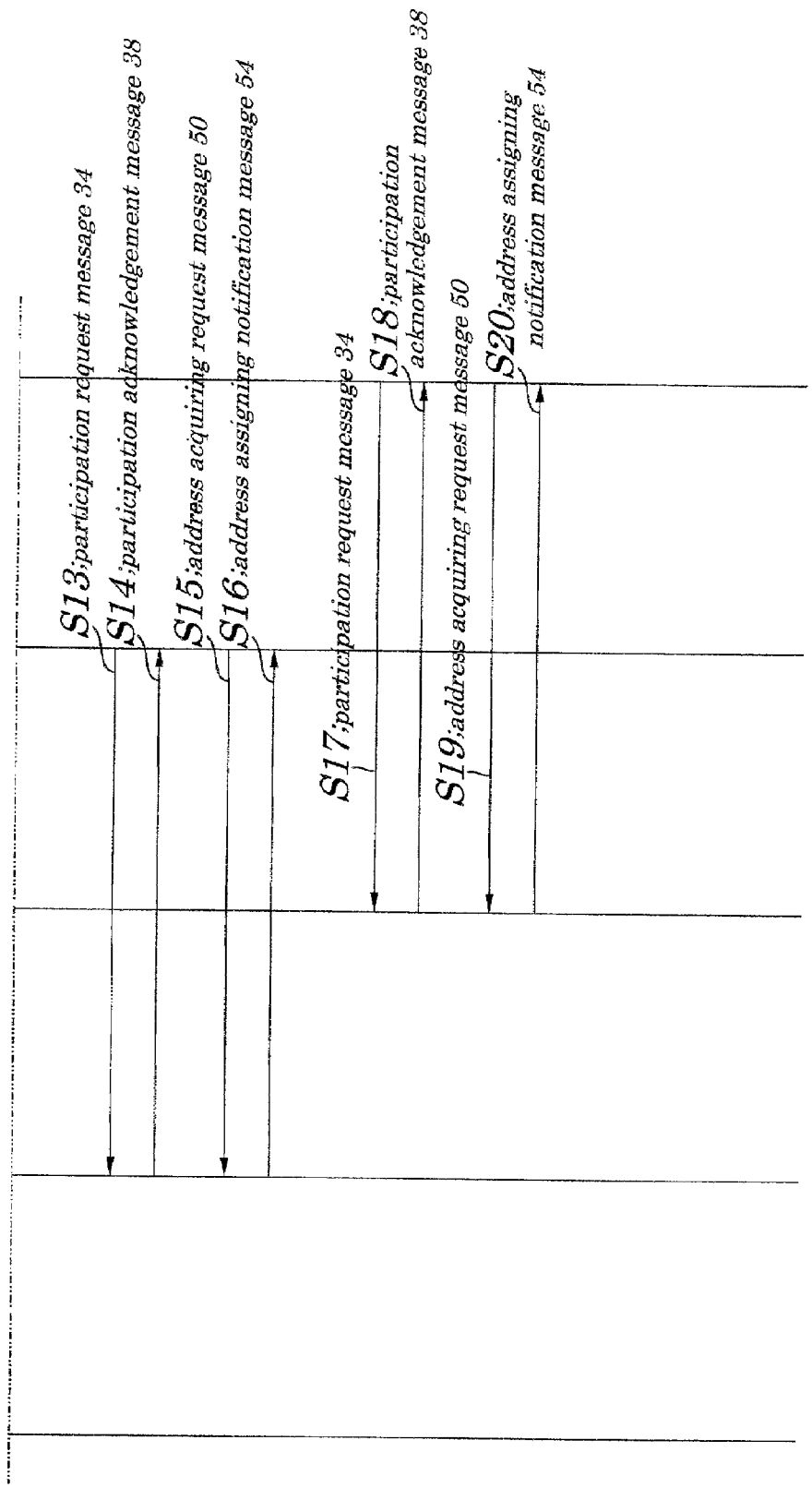
FIG. 16 is a diagram showing sequences of operations required to newly construct the wireless network system according to the embodiment of the present invention.

The radio-relay terminating station 1 has an address managing table 4, an address assigning section 5, an address pool assigning section 6, an input/output section 7, and a parent station processing section B. The address managing table 4 stores and manages a plurality of network addresses to be assigned to each of the radio-relay stations 2-i and to each of the wireless terminals 3-j. With reference to FIGS. 15 and 16, the address assigning section 5, in response to an address acquiring request message 50, transmits an address assigning notification message 54 to its child station.

The address pool assigning section 6, in response to an address pool acquiring request message 70, transmits an address pool assigning notification message 75 to its child station. The input/output section 7 transmits and receives date or messages to and from the child station. The parent station processing section 8 transmits intermittently a wireless control signal message 30 to the child station and, in response to a participation request message 34 transmitted from the child station, transmits a participation acknowledgment message 38.

Each of the radio-relay stations 2-i includes an input/output section 11-i, an address acquiring section 12-i, an address pool acquiring section 13-i, an address managing table 14-i, an address assigning section 15-i, an input/output section 16-i, a child station processing section 17-i, and a parent station processing section 18-i. The input/output section 11-i transmits and receives data or messages to and from the parent station. The address acquiring section 12-i transmits the address acquiring request message 50 to the parent station and acquires an assigned address 57 from the address assigning notification message 54 transmitted from the parent station and stores the acquired address.

The address pool acquiring section 13-i transmits the address pool acquiring request message 70 to the parent station and acquires a plurality of network addresses from the address pool assigning notification message 75 transmitted from the parent station and stores the plurality of acquired network addresses in the address managing table 14-i. The address managing table 14-i stores the plurality of the network addresses to be assigned to the child station of the radio-relay station 2-i and manages them. The address assigning section 15-i, in response to the address acquiring request message 50 transmitted from the child station, transmits the address assigning notification message 54 to its child station.

The input/output section 16-i transmits and receives data or messages to and from the child station. The child station processing section 17-i receives the wireless control signal message 30 transmitted from the parent station and transmits the participation request message 34 to the parent station. The parent station processing section 18-i transmits the wireless control signal message 30 to the child station intermittently and, in response to the participation request message 34, transmits the participation acknowledgment message 38.

Each of the wireless terminals 3-j has an input/output section 21-j, an address acquiring section 22-j, and a child station processing section 23-j. The input/output section 21-j transmits data or messages to and from the parent station. The address acquiring section 22-j transmits the address acquiring request message 30 to the parent station, acquires an assigned address from the address assigning notification message 54 transmitted from the parent station and stores the acquired address. The child station processing section 23-j receives the wireless control signal message 30 transmitted from the parent station and transmits the participation request message 34 to the parent station.

Figure 2:
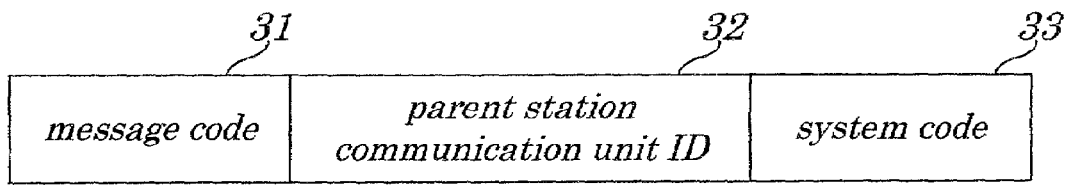
FIG. 2 shows a data structure of a wireless control signal message employed in the wireless network system according to the embodiment of the present invention.

FIG. 2 shows a data structure of the wireless control signal message 30. The wireless control signal message 30 is made up of a message code 31, a parent station communication unit ID (identifier) 32 and a system code 33. The message code 31 is a code to show that a message is the wireless control signal message 30. The parent station communication unit ID 32 is the ID used to uniquely identify the parent station transmitting the wireless control signal message 30 and is set independently of the network address. The system code 33 is a code used to identify a wireless network system to which the parent station transmitting the wireless control signal message 30 belongs. A code being different in every wireless network system is substituted into the system code 33 or one code is substituted into a plurality of the wireless network systems.

Figure 3:
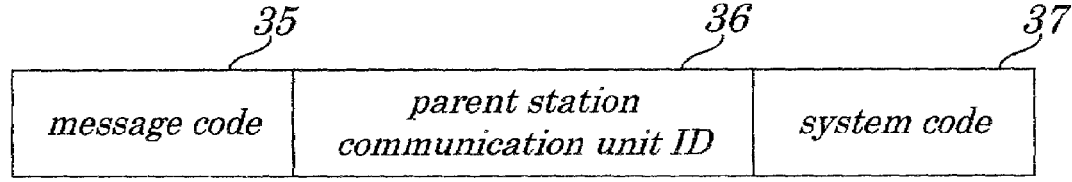
FIG. 3 shows a data structure of a participation request message employed in the wireless network system according to the embodiment of the present invention.

FIG. 3 shows a data structure of the participation request message 34. The participation request message 34 is made up of a message code 35, a parent station communication unit ID 36, and a system code 37. The message code 35 is a code to show that a message is the participation request message 34. A value of the parent station communication unit ID 32 added to the wireless control signal message 30 is substituted as the parent station communication unit ID 36. A value of the system code 33 added to the wireless control signal message 30 is substituted as the system code 37.

Figure 4:
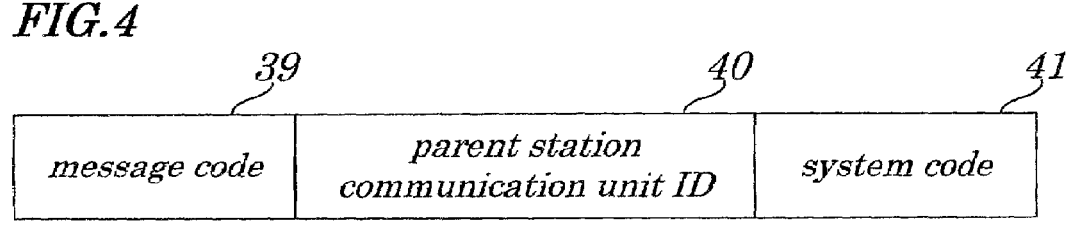
FIG. 4 shows a data structure of a participation acknowledgment message employed in the wireless network system according to the embodiment of the present invention.

FIG. 4 shows a data structure of the participation acknowledgment message 38. The participation acknowledgment message 38 is made up of a message code 39, a parent station communication unit ID 40 and system code 41. The message code 39 is a code to show that a message is the participation acknowledgment message 38. A value of the parent station communication unit ID 32 added to the wireless control signal message 30 is substituted as the parent station communication unit ID 40. The system code 41 is a code used when the parent station identifies the child station uniquely and is set independently of the network address. During a period from time when the child station receives the participation acknowledgment message 38 to time when the child station acquires the network address, the child station uses the system code 41 as the network address.

Figure 5:
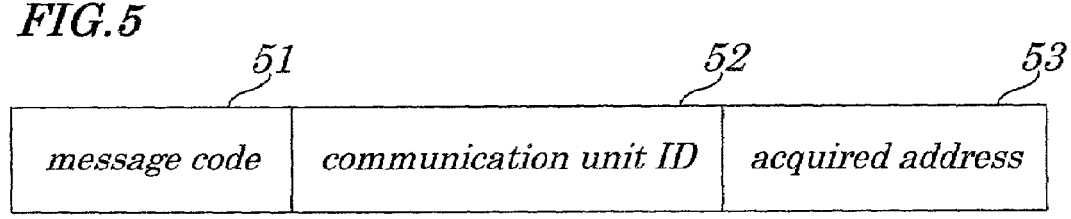
FIG. 5 shows a data structure of an address acquiring request message employed in the wireless network system according to the embodiment of the present invention.

FIG. 5 shows a data structure of the address acquiring request message 50. The address acquiring request message 50 is made up of a message code 51, a communication unit ID 52 and an acquired address 53. The message code 51 is a code to show that a message is the address acquiring request message 50. The communication unit ID 52 is an ID used to uniquely identify the child station transmitting the address acquiring request message 50 and is independent of the network address. When the child station transmitting the address acquiring request message 50 has not yet acquired the network address, a "0" (zero) is substituted as the acquired address 53 and when the child station has already the network address, the acquired network address is substituted as the acquired address 53.

Figure 6:
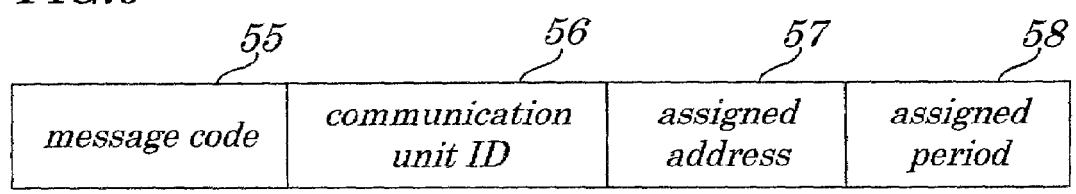
FIG. 6 shows a data structure of an address assigning notification message employed in the wireless network system according to the embodiment of the present invention.
Figure 11:
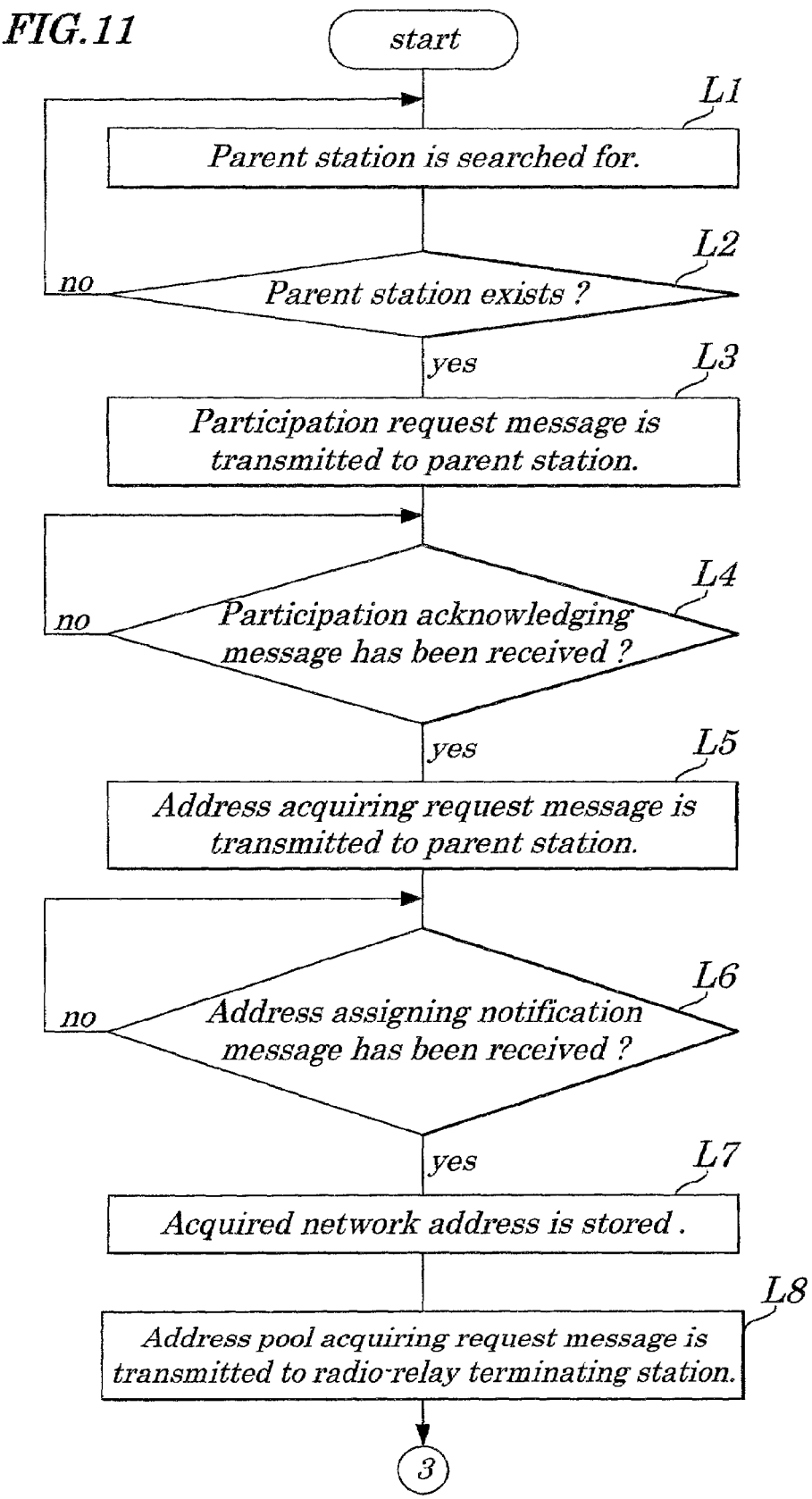
FIG. 11 is a flowchart explaining an operation of a radio-relay station according to the embodiment of the present invention.
Figure 12:
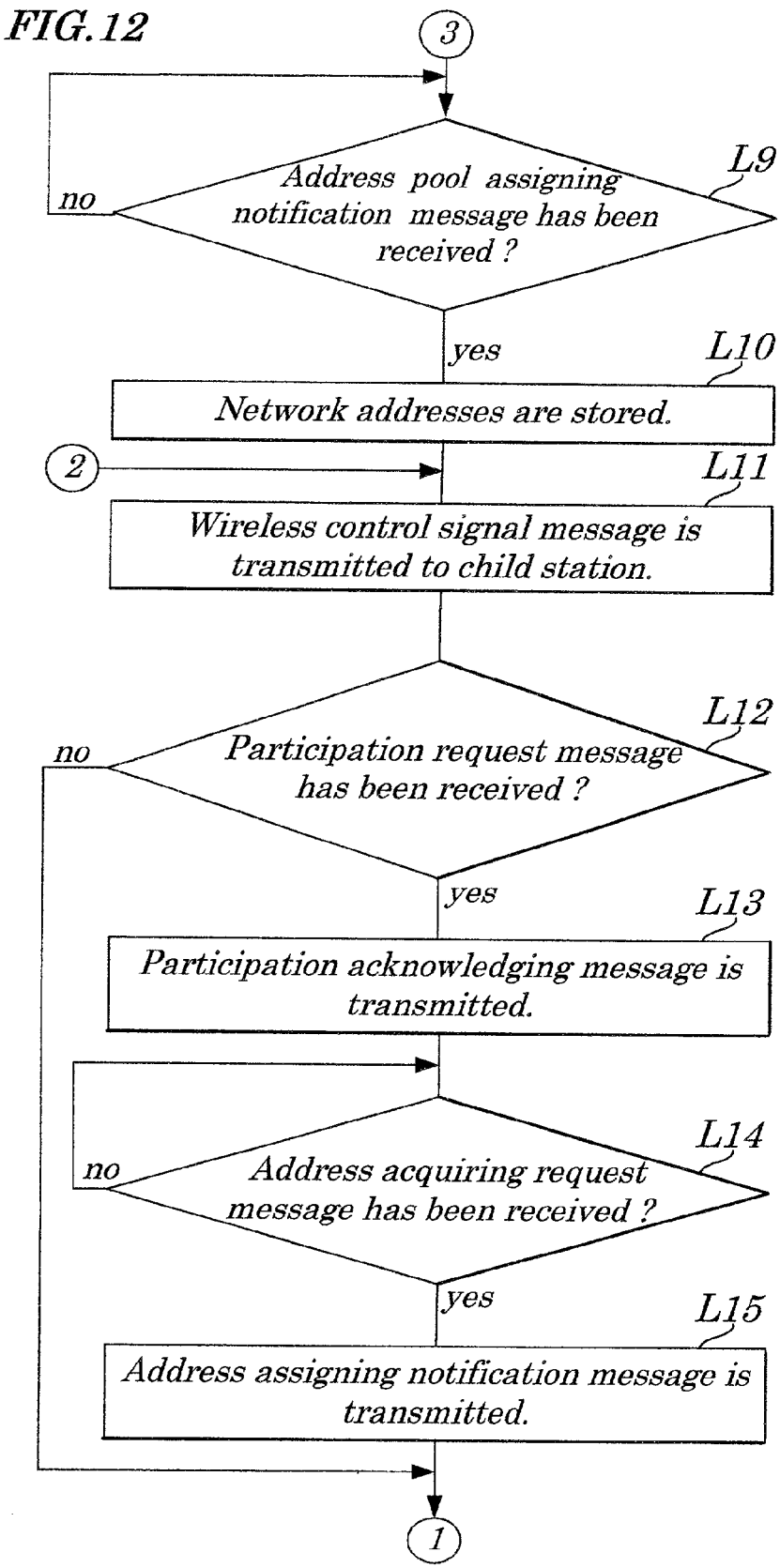
FIG. 12 is a flowchart explaining the operation of the radio-relay station according to the embodiment of the present invention.
Figure 13:
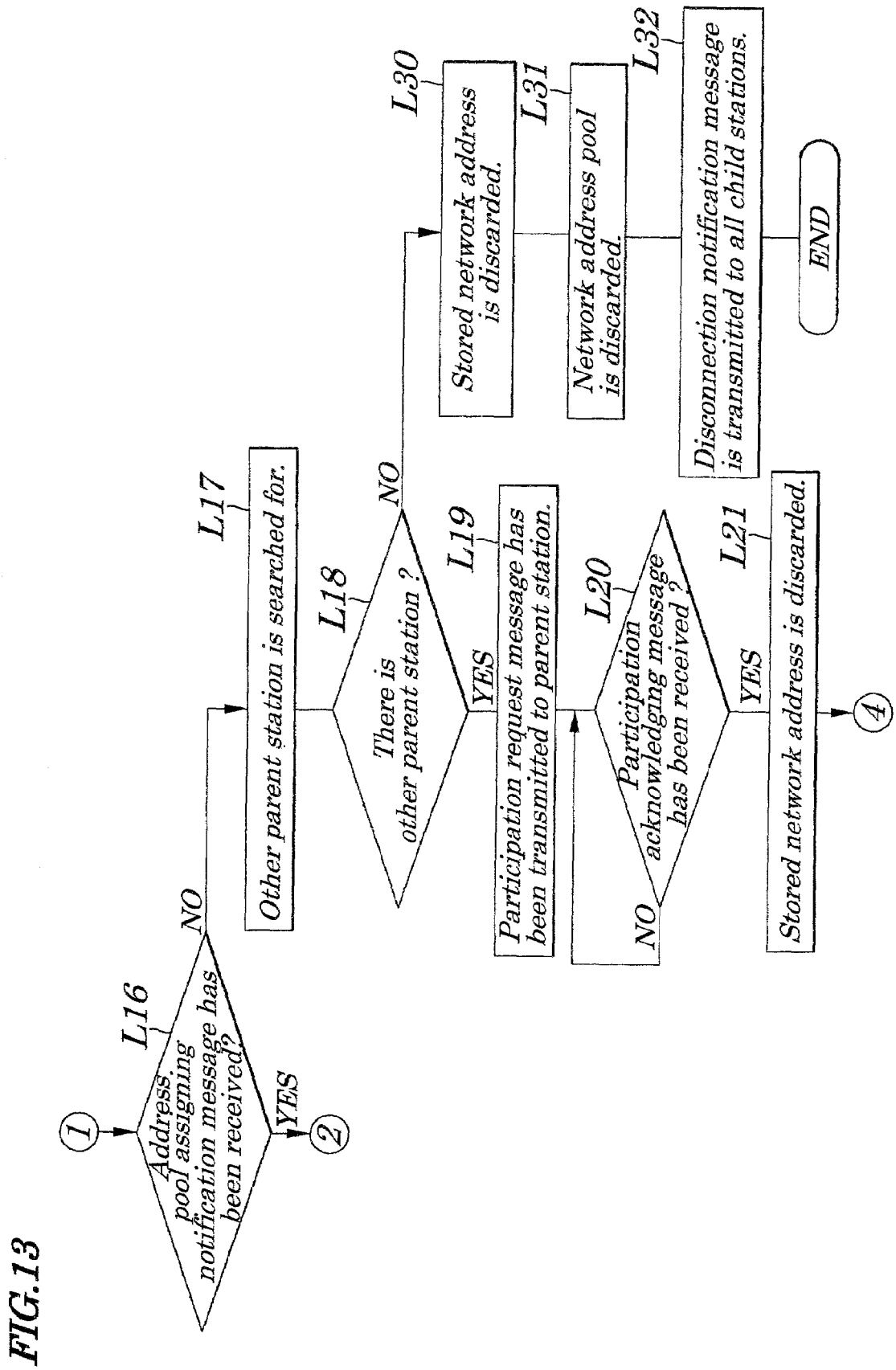
FIG. 13 is a flowchart explaining the operation of the radio-relay station according to the embodiment of the present invention.
Figure 14:
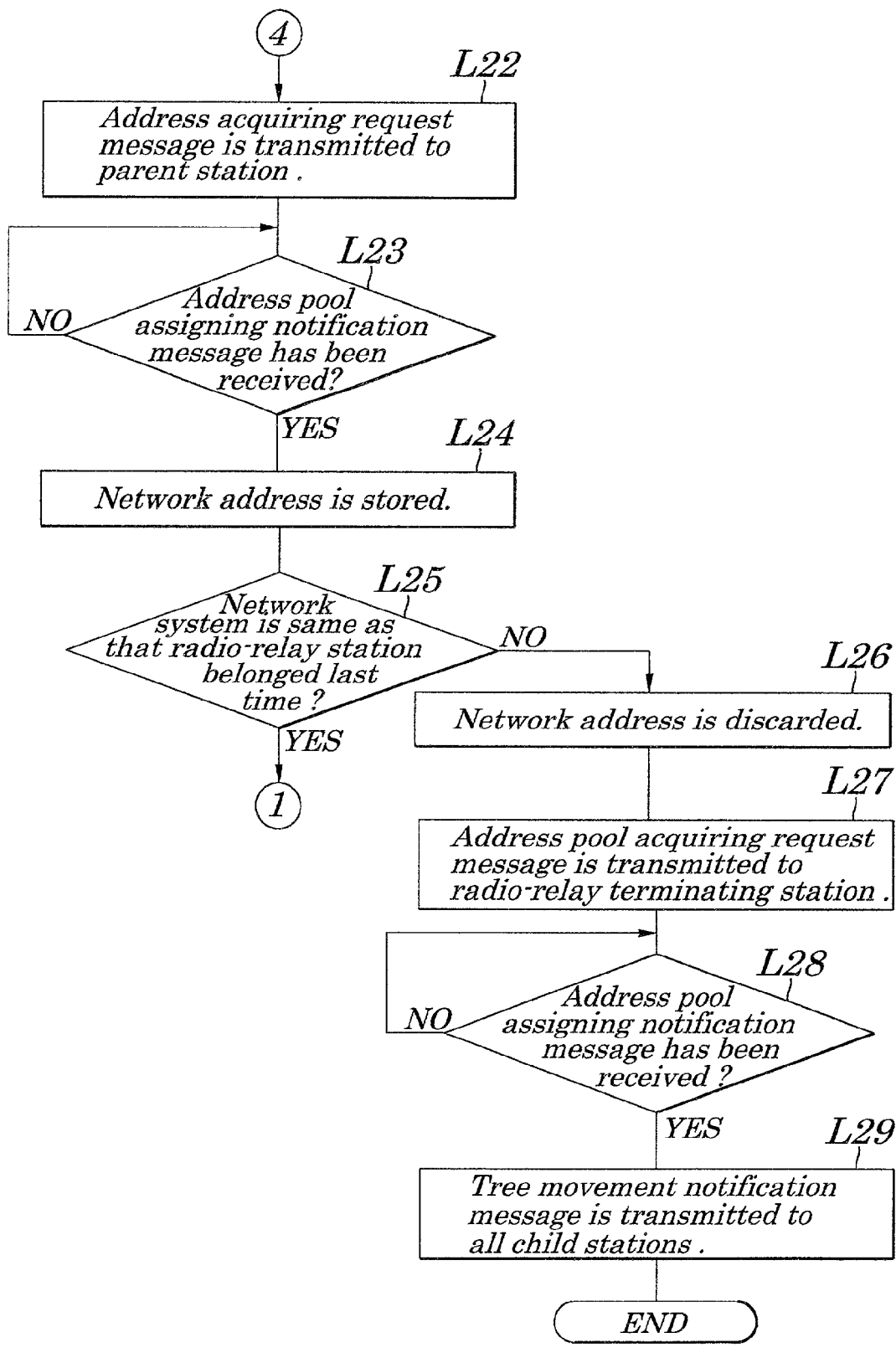
FIG. 14 is a flowchart explaining the operation of the radio-relay station according to the embodiment of the present invention.

FIG. 6 shows a data structure of the address assigning notification message 54. The address assigning notification message 54 is made up of a message code 55, a communication unit ID 56, an assigned address 57, and an assigned period 58. The message code 55 is a code to show that a message is the address assigning notification message 54. A value of the communication unit ID 52 added to the address acquiring request message 50 is substituted as the communication unit ID 56. The assigned address 57 is the network address to be assigned to the child station. The assigned period 58 is a period during which the network address to be assigned to the child station can be used. The child station, when using the same network address for a period exceeding the assigned period 58, transmits the address acquiring request message 50 to the parent station and renews the network address.

FIG. 7 shows a data structure of an address assigning refusing message 60. The address assigning refusing message 60 is made up of a message code 61, a communication unit ID 62, and a requested address 63. The message code 61 is a code to show that a message is the address assigning refusing message 60. A value of the communication unit ID 52 of the child station added to the address acquiring request message 50 is substituted as the communication unit ID 62. The acquired address 53 added to the address acquiring request message 50 is substituted as the requested address 63.

FIG. 8 shows a data structure or an address pool acquiring request message 70. The address pool acquiring request message 70 is made up of a message code 71, a communication unit ID 72, numbers of requested addresses 73, and a head address of an acquired pool 74. The message code 71 is a code to show that a message is the address pool acquiring request message 70. The communication unit ID 72 is the ID used to uniquely identify the child station transmitting the address pool acquiring request message 70. The number of the network addresses that is desired to be acquired is substituted as the number of the requested addresses 73. When the child station transmitting the address pool acquiring request message 70 has not yet acquired the address pool, "0" (zero) is substituted as the head address of acquired pool 74 and when the child station has already acquired the address pool, the head network address of the address pool is substituted.

FIG. 9 shows a data structure of the address pool assigning notification message 75. The address pool assigning notification message 75 is made up of a message code 76, a communication unit ID 77, numbers of assigned addresses 18, a head address of assigned pool 79, and assigned period 80. The message code 76 is a code to show that a message is the address pool assigning notification message 75. A value of the communication unit ID 72 added to the address pool acquiring request message 70 is substituted as the communication unit ID 77. The numbers of assigned addresses 78 is the number of the network address to be assigned to the child station. The head address of the assigned pool 79 is the head network address out of a plurality of consecutive network addresses to be assigned to the child station. A period during which the address pool to be assigned to the child station can be used is substituted as the assigned period 80. The child station, when using the same network address for a period exceeding the assigned period 80, transmits the address pool acquiring request message 70 to the parent station and renews the address pool.

FIG. 10 shows a data structure of an address pool assigning refusing message 81. The address pool assigning refusing message 81 is made up of a message code 82, a communication unit ID 83, and a head address of requested pool 84. The message code 82 is a code to show that a message is the address pool assigning refusing message 81. A value of the communication unit ID 72 of the child station added to the address pool acquiring request message 70 is substituted as the communication unit ID 83. A value of the head address of acquired pool 74 added to the address pool acquiring request message 70 is substituted as the head address of requested pool 84.

A disconnection notifying message 86 is transmitted from the radio-relay station 2-i being the parent station to the child station and is used to notify the child station that the communication between the parent station and the wireless network system has become impossible. A tree movement notifying message 88 is transmitted from the radio-relay station 2-i being the parent station to the child station and is used to notify the child station that the connection of the parent station has moved to another wireless network system.

A private address is set to the network address for the wireless network system of the present invention, for example, 10.0.0.0/8 with a high-order one byte being fixed is set. The wireless network system is constructed for every radio-relay terminating station 1. A high-order second byte of the network address is used to identify each of the wireless network systems. For example, the private address, 10.1.0. 0/16 with its high-order second byte being fixed, is set to the wireless network system constructed of the radio-relay terminating station 1 and another private address, 10.2.0.0/16 with its high-order second byte being fixed, is set to the wireless network system constructed of another radio-relay terminating station 1'.

The radio-relay terminating station 1 stores private addresses 10.1.0.1/24 to 10.1.0.254/24 as the network addresses to be assigned to the radio-relay station 2-i and private addresses 10.1.1.1/24 to 10.1.254.254/24 as an address pool to be provided to the radio-relay station 2-i. The address pool is a plurality of network addresses to be assigned by the radio-relay station 2-i to its child stations.

The radio-relay terminating station 1 assigns the address pool to the radio-relay station 2-i. The number of the network addresses belonging to the address pool is a fixed number. Because it is the fixed number, work of the radio-relay terminating station 1 managing the network address is made easy and work that the radio-relay station 2-i assigns the network address is made simple.

The radio-relay station 2-i acquires one network address out of the acquired address pool, assigns the acquired network address to the radio-relay station 2-i and uses it for communications with its child station. The remaining network address contained in the address pool is assigned to each of the child stations. For example, if the number of the network addresses contained in the address pool is eight, the network address having a remainder obtained by dividing the value of the network addresses by eight being 1 (one) is assigned to the radio-relay station and the network address having the remainder obtained by dividing the value of the network address by eight being not 1 (one) is assigned to its child station.

For example, when eight addresses 10.1.1.1/24 to 10.1.1.8/24 as the address pool are assigned to the parent station, the addresses 10.1.1.1/24 is assigned to the radio-relay station and the addresses 10.1.1.2/24 to 10.1.1.8/24 are assigned to its child station. At this point, the network address of the parent station is a function of the network address of the child station and the network address obtained by substituting 001 for low-order three bits of the network address assigned to its child station is the network address of the parent station of the child station. If the network address of the child station is 10.1.1.2/24, the network address of its parent station is 10.1.1.1/24.

When an operation of the radio-relay terminating station 1 starts, the parent station processing section 8 in the radio-relay terminating station 1 transmits the wireless control signal message 30 through the input/output section 7 intermittently to the child station. The parent station processing section 8, in response to the participation request message 34 fed from the child station, transmits the participation acknowledgment message 38 to the child station. The address assigning section 5, in response to the address acquiring request message 50 fed from the child station, acquires the assigned address from the address managing table 4, describes the acquired assigned address on the address assigning notification message 54 and transmits it to the child station. When there is shortage of the network address to be assigned, the address assigning section 5 transmits the address assigning refusing message 60 to refuse the request for the network address from the child station.

The address pool assigning section 6 in the radio-relay terminating station 1, in response to the address pool acquiring request message 70 fed from the child station, acquires the network address corresponding to the numbers of requested addresses 73 from the address managing table 4, describes the acquired network address pool on the address pool assigning notification message 75 and notifies the child station of it.

FIG. 11 to FIG. 14 are flowcharts explaining operations of the radio-relay station 2-i according to the embodiment of the present invention. When an operation of the radio-relay station 2-i starts, the operational flow shown in the flowchart also commences. First, the child station processing section 17-i in the radio-relay station 2-i retrieves, through the input/output section 11-i on the side of the parent station, the wireless control signal message 30 to be transmitted from the parent station (Step L1). Its parent is either of the radio-relay terminating station 1 or other radio-relay station 2-i.

The child station processing section 17-i, when having not received the wireless control signal message 30 to be transmitted from the parent station (Step L2; NO), repeats Step L1 and retrieves the wireless control signal message 30. The child station processing section 17-i, when having received the wireless control signal message 30 (Step L2; YES), transmits, through the input/output section 11-i on the parent station side, the participation request message 34 to the parent station transmitting the wireless control signal message 30 (Step L3).

The child station processing section 17-i retrieves, through the input/output section 11-i on the side of the parent station, the participation acknowledgment message 38 to be transmitted from the parent station. It the child station processing section 17-i does not receive the participation acknowledgment message 38 to be transmitted from the parent station (Step L4; NO), the child station processing section 17-i repeats the retrieval of the participation acknowledgment message 38. The child station processing section 17-i, when having received the participation acknowledgment message 38 (Step L4; YES), transmits the address acquiring request message 50 to the parent station having transmitted the participation acknowledgment message 38 (Step L5).

The address acquiring section 12-i, through the input/output section 11-i, retrieves the address assigning notification message 54 to be transmitted from the parent station. The address acquiring section 12-i, when not receiving the address assigning notification message 54 to be transmitted from the parent station (Step L6; NO), repeats the retrieval of the address assigning notification message 54.

The address acquiring section 12-i, when having received the address assigning notification message 54 (Step L6; YES), acquires the assigned address 57 from the address assigning notification message 54 and stores the assigned address 57 (Step L7). The address pool acquiring section 13-i transmits, through the input/output section 11-i on the side of the parent station, the address pool acquiring request message 70 to the radio-relay terminating station 1 in the wireless network system to which the parent station belongs (step L8).

The radio-relay terminating station 1, in response to the address pool acquiring request message 70, transmits the address pool assigning notification message 75 to the radio-relay station 2-i. The address pool acquiring section 13-i, through the input/output section on the side of the parent station 11-i, retrieves the address pool assigning notification message 75 to be transmitted from the radio-relay terminating station 1. The address pool acquiring section 13-i, when not receiving the address pool assigning notification message 75 to be transmitted from the radio-relay terminating station 1 (Step L9; NO), repeats the retrieval of the address pool assigning notification message 75.

The address pool acquiring section 13-i, when having received the address pool assigning notification message 75 (Step L9; YES), acquires the numbers of assigned addresses 78 from the address pool assigning notification message 75 and the head address of assigned pool 79, produces a plurality of the network addresses and stores the plurality of the network addresses on the address managing table 14-i (Step L10).

The parent station processing section 18-i, through the input/output section 16-i on the side of the child station, transmits the wireless control signal message 30 to the child station (Step L11). The child station is either of other radio-relay station 2-i" or the w reless terminal 3-j. The child station, in response to the wireless control signal message 30, transmits the participation request message 34 to the radio-relay station 2-i. The parent station processing section 18-i, through the input/output section 16-i on the side of the child station, retrieves the participation request message 34 to be transmitted from the child station.

The parent station processing section 18-i, when having received the participation request message 34 (Step L12), transmits the participation acknowledgment message 38 to the child station which has transmitted the participation request message 34 (Step L13). The child station, in response to the participation acknowledgment message 38, transmits the address acquiring request message 50 to the radio-relay station 2-i. The parent station processing section 18-i, when not receiving the address acquiring request message 50 to be transmitted from the child station (Step L14; NO), repeats the retrieval of the address acquiring request message 50. The parent station processing section 18-i, when having received the address acquiring request message 50 (Step L14; YES), transmits the address assigning notification message 54 to the child station which has transmitted the address acquiring request message 50 (Step L15).

The child station processing section 17-i, when the parent station processing section 18-i has not received the participation request message 34 within a predetermined period of time (Step L12; NO) or after the parent station processing section 18-i has transmitted the address assigning notification message 54 to the child station, judges whether the communication with the parent station is possible or not (Step Ll6). When the communication with the parent station is possible (Step L16; YES), the procedure in Step L11 is again performed and the parent station processing section 18-i transmits the wireless control signal message 30 to the child station.

The child station processing section 17-i, when the communication with the parent station is impossible (Step L16; NO), through the input/output section 11-i on the side of the parent station, retrieves the wireless control signal message 30 to be transmitted from the other parent station (Step L17). The other parent station is either of the radio-relay terminating station 1 or other radio-relay station 2-i'.

The child station processing section 17-i, when having received the wireless control signal message 30 fed from the parent station (Step L18; YES), transmits the participation request message 34 to the parent station transmitting the wireless control signal message 30 (Step L19). The parent station, in response to the participation request message 34, transmits the participation acknowledgment message 38 to the radio-relay station 2-i. The child station processing section 17-i, through the input/output section 11-i on the side of the parent stations retrieves the participation acknowledgment message 38 to be fed from the parent station. The child station processing section 17-i, when not receiving the participation acknowledgment message 38 from the parent station (Step L20; NO), repeats the retrieval of the participation acknowledgment message 38.

When the child station processing section 17-i has received the participation acknowledgment message 38 (Step L20; YES), the address acquiring section 12-i discards the stored network address (Step L21). The address acquiring section 12-i transmits the address acquiring request message 50 to the parent station that has fed the participation acknowledgment message 38 (Step L22). The parent station, in response to the address acquiring request message 50, transmits the address assigning notification message 54 to the radio-relay station 2-i.

The address acquiring section 12-i, retrieves the address assigning notification message 54 to be fed from the parent station, through the input/output section 11-i on the side of the parent station. The address acquiring section 12-i, when not receiving the address assigning notification message 54 to be fed from the parent station (Step L23; NO), repeats the retrieval of the address assigning notification message 54.

The address acquiring section 12-i, when having received the address assigning notification message 54 (Step L23; YES), acquires the assigned address 57 from the address assigning notification message 54 and stores the assigned address 57 (Step L24). The address acquiring section 12-i judges whether the wireless network system to which the radio-relay station 2-i belonged last time is the same as that to which the radio-relay station 2-i belongs this time (Step L25).

The judgment in Step L25 is made by comparison between the network address acquired last time and the network address acquired this time. That is, by comparing a second high-order byte the network address, each wireless network system is identified and whether the wireless network system to which the radio-relay station 2-i belonged last time is the same as that to which the radio-relay station 2-i belongs this time.

If the radio-relay station 2-i belongs to the network system being different from that to which the radio-relay station 2-i belonged last time (Step L25; YES), the procedure in Step L16 is again performed. When the radio-relay station 2-i belongs to the same network to which it belonged last time (Step L25; NO), the address pool acquiring section 13-i discards the stored network address pool (Step L26). The address pool acquiring section 13-i, through the input/output section 11-i on the side of the parent station, transmits the address pool acquiring request message 70 to the radio-relay terminating station 1' in the wireless network system to which the parent station belongs (Step L27).

The radio-relay terminating station 1' in response to the address pool acquiring request message 70, transmits the address pool assigning notification message 75 to the radio-relay station 2-i. The address pool acquiring section 13-i, through the input/output section 11-i on the side of the parent station, retrieves the address pool assigning notification message 75 to be fed from the radio-relay terminating station 1'. The address pool acquiring section 13-i, when not receiving the address pool assigning notification message 75 to be fed from the radio-relay terminating station 1' (Step L28; NO), repeats the retrieval of the address pool assigning notification message 75.

The address pool acquiring section 13-i, when having received the address pool assigning notification message 75 (Step L28; YES), acquires the numbers of the assigned addresses 78 and the head address of assigned pool 79 from the address pool assigning notification message 75, produces a plurality of addresses and stores the plurality of the addresses in the address managing table 14-i. The parent station processing section 18-i transmits the tree movement notifying message 88 (Step L29). The network address is again assigned to all the child stations.

When the child station processing section 17-i has not received the wireless control signal message 30 to be fed from the parent station (Step L18; NO), discards the stored network address (Step L30) and the address pool acquiring section 13-i discards the stored network address pool (Step L31). The parent station processing section 18-i transmits a disconnection notification message 86 to all the child stations connected to the radio-relay station 2-i (Step L32).

When operations of the wireless terminal 3-j are started, the child station processing section 23-j retrieves the wireless control signal message 30 to be fed from the parent station, through the input/output section 21-j. The child station processing section 23-j, when having received the wireless control signal message 30 to be fed from the parent station, transmits the participation request message 34, through the input/output section 21-j, to the parent station.

The address acquiring section 22-j transmits the address acquiring request message 50 through the input/output section 21-j to the parent station. The address acquiring section 22-j, when having received the address assigning notification message 54 from the parent station, acquires the assigned address 57 from the address assigning notification message 54 and stores the assigned address 57.

When the communication with the parent station is made impossible, the child station processing section 23-j retrieves the wireless control signal message 30 to be fed from other parent station. The child station processing section 23-j, when having received the wireless control signal message 30 from the parent station, transmits, through the input/output section 21-j, the participation request message 34 to the parent station. The address acquiring section 22-j discards the stored network address and transmits the address acquiring request message 50 to the parent station.

FIGS. 15 and 16 are diagrams showing sequences of operations required to newly construct the wireless network system. Of the communication devices making up the wireless network system, the radio-relay terminating station 1 is first booted. At this point, to the address managing table 4 in the radio-relay terminating station 1 are set the network addresses that can be initially used. The parent station processing section 8 in the radio-relay terminating station 1 transmits the wireless control signal message 30 intermittently to the child station through the input/output section 7.

When operations of the radio-relay station 2-1 start, the child station processing section 17-1 in the radio-relay station 2-1 retrieves, through the input/output section 11-1 on the side of the parent station, the wireless control signal message 30 to be fed from the radio-relay terminating station 1. The child station processing section 17-1, in response to the wireless control signal message 30, transmits the participation request message 34 to the radio-relay terminating station 1 (Step S1) to request that the radio-relay station 2-1 becomes the child station of the radio-relay terminating station 1.

The parent station processing section 8 in the radio-relay terminating station 1 receives the participation request message 34 from the radio-relay station 2-1 through the input/output section 7. The parent station processing section 8, if it allows the network system to participate, transmits the participation acknowledgment message 38 to the radio-relay station 2-1 (Step S2). The child station processing section 17-1 in the radio-relay station 2-1 receives the participation acknowledgment message 38. By such exchange of messages, the radio-relay terminating station 1 serving as the parent station can carry out communications with the radio-relay station 2-1 serving as the child station.

The address acquiring section 12-1 transmits the address acquiring request message 50 to the radio-relay terminating station 1 to make a request for the network address (Step S3). The address assigning section 5 of the radio-relay terminating station 1, in response to the address acquiring request message 50, acquires the assigned address from the address managing table 4, describes the acquired assigned address on the address assigning notification message 54 and transmits it to the radio-relay station 2-1 (Step S4). When there is shortage of the network address to be assigned, the radio-relay terminating station 1 transmits the address assigning refusing message 60 to refuse the request for the network address from the child station.

The address acquiring section 12-1 in the radio-relay station 2-1 receives the address assigning notification message 54. The address acquiring section 12-1 acquires the assigned address 57 from the address assigning notification message 54 and stores it. The address pool acquiring section 13-1 in the radio-relay station 2-1 transmits the address pool acquiring request message 70 to the radio-relay terminating station 1 (Step S5).

The address pool assigning section 6 in the radio-relay terminating station 1 receives the address pool acquiring request message 70 from the radio-relay station 2-1. The address pool assigning section 6 acquires the network address corresponding to numbers of requested addresses 73 from the address managing table 4, describes the acquired network address pool on the address pool assigning notification message 75 and notifies the radio-relay station 2-1 of it (Step S6).

The radio-relay terminating station 1, if it refuses the address pool acquiring request message 70 due to shortages in the network address pool to be assigned or a like, transmits the address pool assigning refusing message 81.

The address pool acquiring section 13-1 in the radio-relay station 2-1, in response to the address pool assigning notification message 75, acquires the assigned address pool from the address pool assigning notification message 75 and stores the assigned address pool in the address managing table 14-1. The parent station processing section 18-1 in the radio-relay station 2-1 transmits the wireless control signal message 30 to the child station over a wireless channel being different from the wireless channel being used by the radio-relay terminating station 1.

Next, when operations of the radio-relay station 2-2 start, the same processing as performed on the radio-relay station 2-1 is performed (Step S1 to S6) That is, when operations of the radio-relay station 2-2 start, the child station processing section 17-2 in the radio-relay station 2-2 retrieves the wireless control signal message 30 to be fed from the parent station through the input/output section 11-2 on the side of the parent station. The child station processing section 17-2, in response to the wireless control signal message 30 to be fed from the radio-relay terminating station 1, transmits the participation request message 34 to the radio-relay terminating station 1 (Step S7) and requests that the radio-relay station 2-2 becomes the child station of the radio-relay terminating station 1.

The parent station processing section 8 in the radio-relay terminating station 1 receives the participation request message 34 from the radio-relay station 2-2 through the input/output section 7. The parent station processing section 8, if it allows the participation of the network system, transmits the participation acknowledgment message 38 to the radio-relay station 2-2 (Step S8). The child station processing section 17-2 in the radio-relay station 2-2 receives the participation acknowledgment message 38. By such exchange of messages, the radio-relay terminating station 1 serving as the parent station can carry out communications with the radio-relay station 2-2 serving as the child station.

The address acquiring section 12-2 transmits the address acquiring request message 50 to the radio-relay terminating station 1 and makes a request for the acquisition of the network address (Step S9). The address assigning section 5 in the radio-relay terminating station 1, in response to the address acquiring request message 50, acquires the assigned address from the address managing table 4, describes the acquired address on the address assigning notification message 54 and transmits it to the radio-relay station 2-2 (Step S10). When there is shortage of the network address to be assigned, the radio-relay terminating station 1 transmits the address assigning refusing message 60 to refuse the request for the network address from the radio-relay station 2-2.

The address acquiring section 12-2 in the radio-relay station 2-2 receives the address assigning notification message 54. The address acquiring section 12-2 acquires the assigned address 57 from the address assigning notification message 54 and stores it. The address pool acquiring section 13-2 in the radio-relay station 2-2 transmits the address pool acquiring request message 70 to the radio-relay terminating station 1 (Step S11).

The address pool assigning section 6 in the radio-relay terminating station 1 receives the address pool acquiring request message 70 from the radio-relay station 2-2. The address pool assigning section 6 acquires the network address corresponding to numbers of requested addresses 73 from the address managing table 4 and describes the acquired network address pool on the address assigning notification message 75 and notifies the radio-relay station 2-2 of it (Step S12).

The address pool acquiring section 13-2 in the radio-relay station 2-2, in response to the address pool assigning notification message 75, acquires the address pool assigned from the address pool assigning notification message 75 and stores the assigned address pool in the address managing table 14-2. The parent station processing section 18-2 in the radio-relay station 2-2 transmits the wireless control signal message 30 to the child station over the wireless channel being different from that used in the radio-relay terminating station 1.

When operations of the wireless terminal 3-1 start, the child station processing section 23-1 retrieves the wireless control signal message 30 to be transmitted from the parent station. The child station processing section 23-1, in response to the wireless control signal message 30 to be fed from the radio-relay station 2-1, transmits the participation request message 34 to the radio-relay station 2-1 (Step S13) and requests that the radio-relay station 2-1 becomes the child station of the radio-relay terminating station 1.

The parent station processing section 18-1 in the radio-relay station 2-1 receives the participation request message 34 from the wireless terminal 3-1. The parent station processing section 18-1, if it allows the participation of the network system, transmits the participation acknowledgment message 38 to the wireless terminal 3-1 (Step S14). The child station processing section 23-1 in the wireless terminal 3-1 receives the participation acknowledgment message 38. By such exchange of messages, the radio-relay station 2-1 serving as the parent station can carry out communications with the wireless terminal 3-1 serving as the child station.

The address acquiring section 22-1 transmits the address acquiring request message 50 to the radio-relay station 2-1 to make a request for acquisition of the network address (Step S15). The address assigning section 15-1 in the radio-relay station 2-1, in response to the address acquiring request message 50, acquires the assigned address from the address managing table 14-1, describes the acquired assigned address on the address assigning notification message 54 and notifies the wireless terminal 3-1 of it (Step S16). When there is shortage of the network address to be assigned, the radio-relay station 2-1 transmits the address assigning refusing message 60 to refuse the request for the network address from the wireless terminal 3-1.

The address acquiring section 22-1 in the wireless terminal 3-1, when having received the address assigning notification message 54 from the radio-relay station 2-1, acquires the assigned address 57 from the address assigning notification message 54 and stores it.

When operations of the wireless terminal 3-2 start, the same processing as performed on the wireless terminal 3-1 is performed (Step S13 to S16). That is, when operations of the wireless terminal 3-2 start, the child station processing section 23-2 retrieves the wireless control signal message 30 to be fed from the parent station. The child station processing section 23-2, in response to the wireless control signal message 30 to be fed from the radio-relay station 2-2, transmits the participation request message 34 to the radio-relay station 2-2 (Step S17) and requests that the radio-relay station 2-2 becomes the child station of the radio-relay terminating station 1.

The parent station processing section 18-2 in the radio-relay station 2-2 receives the participation request message 34 front the wireless terminal 3-2. The parent station processing section 18-2, if it allows the participation of the network system, transmits the participation acknowledgment message 38 to the wireless terminal 3-2 (Step S18). The child station processing section 23-2 in the wireless terminal 3-2 receives the participation acknowledgment message 38. By such exchange of messages, the radio-relay station 2-2 serving as the parent station can carry out communications with the wireless terminal 3-2 serving as the child station.

The address acquiring section 22-2 transmits the address acquiring request message 50 to the radio-relay station 2-2 to make a request for acquisition of the network address (Step S19). The address assigning section 15-2 in the radio-relay station 2-2, in response to the address acquiring request message 50, acquires the assigned address from the address managing table 14-2, describes the acquired assigned address on the address assigning notification message 54 and notifies the wireless terminal 3-2 of it (Step S20). The address acquiring section 22-2 in the wireless terminal 3-2, when having received the address assigning notification message 54 from the radio-relay station 2-2, acquires the assigned address 57 from the address assigning notification message 54 and stores it.

Figure 17:
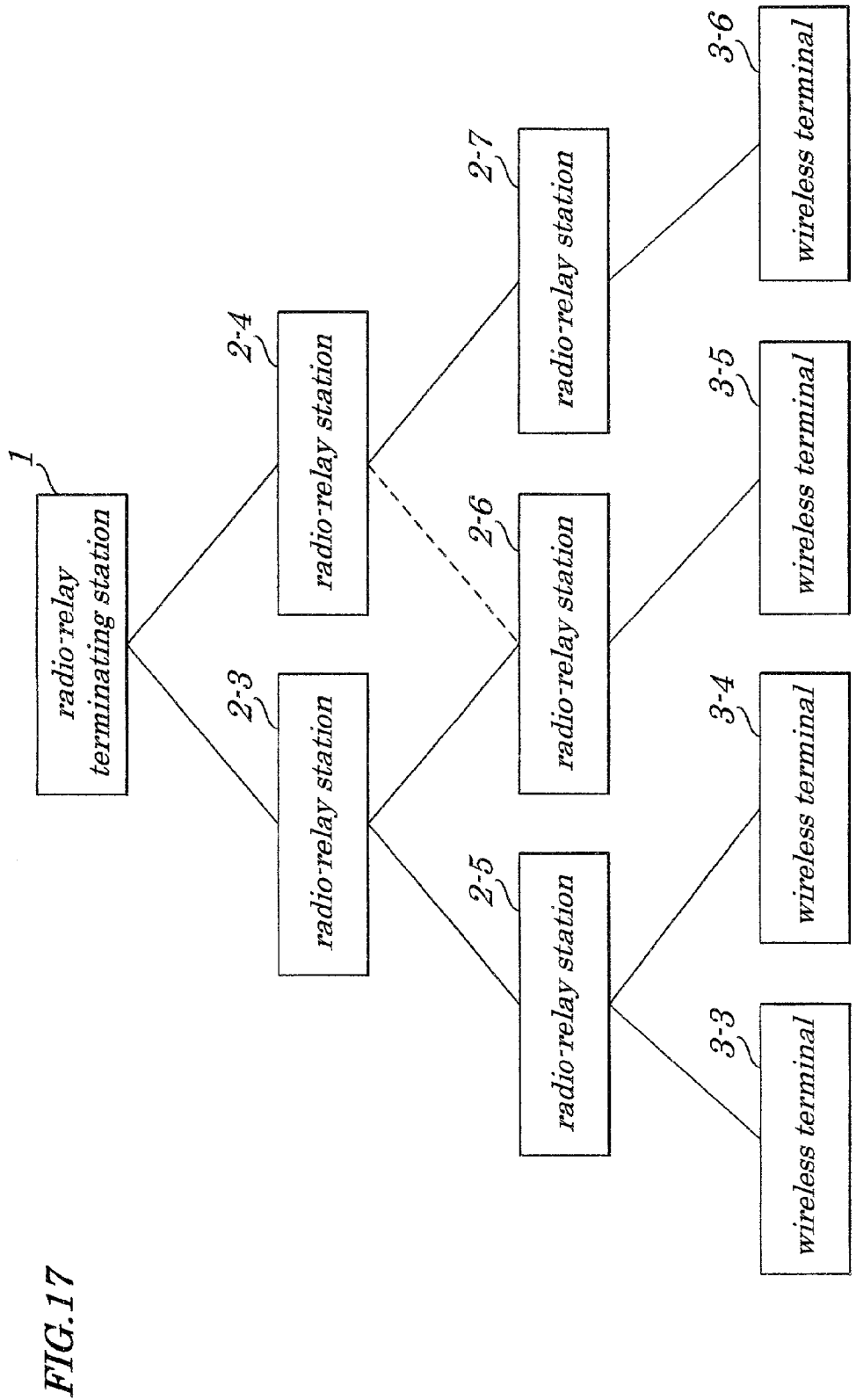
FIG. 17 is a block diagram showing another example of the wireless network system according to the embodiment of the present invention.

FIG. 17 is a schematic block diagram showing another example of the wireless network system according to the embodiment of the present invention. The radio-relay terminating station 1 is connected to the radio-relay station 2-3 and to the radio-relay station 2-4. The radio-relay station 2-3 is connected to the radio-relay station 2-5 and to the radio-relay station 26. The radio-relay station 2-4 is connected to the radio-relay station 2-7. The radio-relay station 2-5 is connected to the wireless terminal 3-3 and to the wireless terminal 3-4. The radio-relay station 2-6 is connected to the wireless terminal 3-5. The radio-relay station 2-7 is connected to the wireless terminal 3-6.

Figure 18:
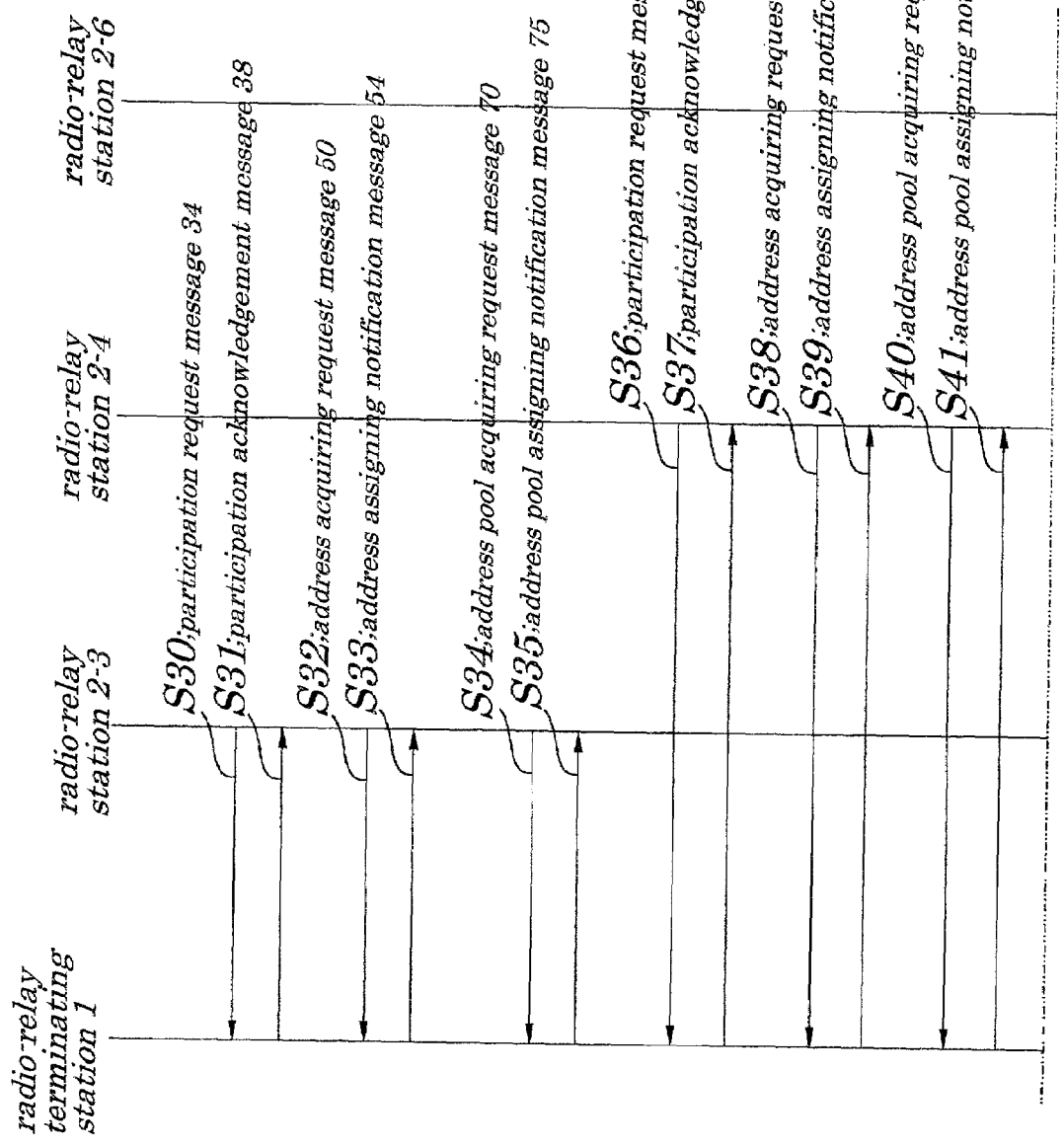
FIG. 18 is a diagram showing operations performed when communication between two communication devices making up the wireless network system of the embodiment becomes impossible.
Figure 19:
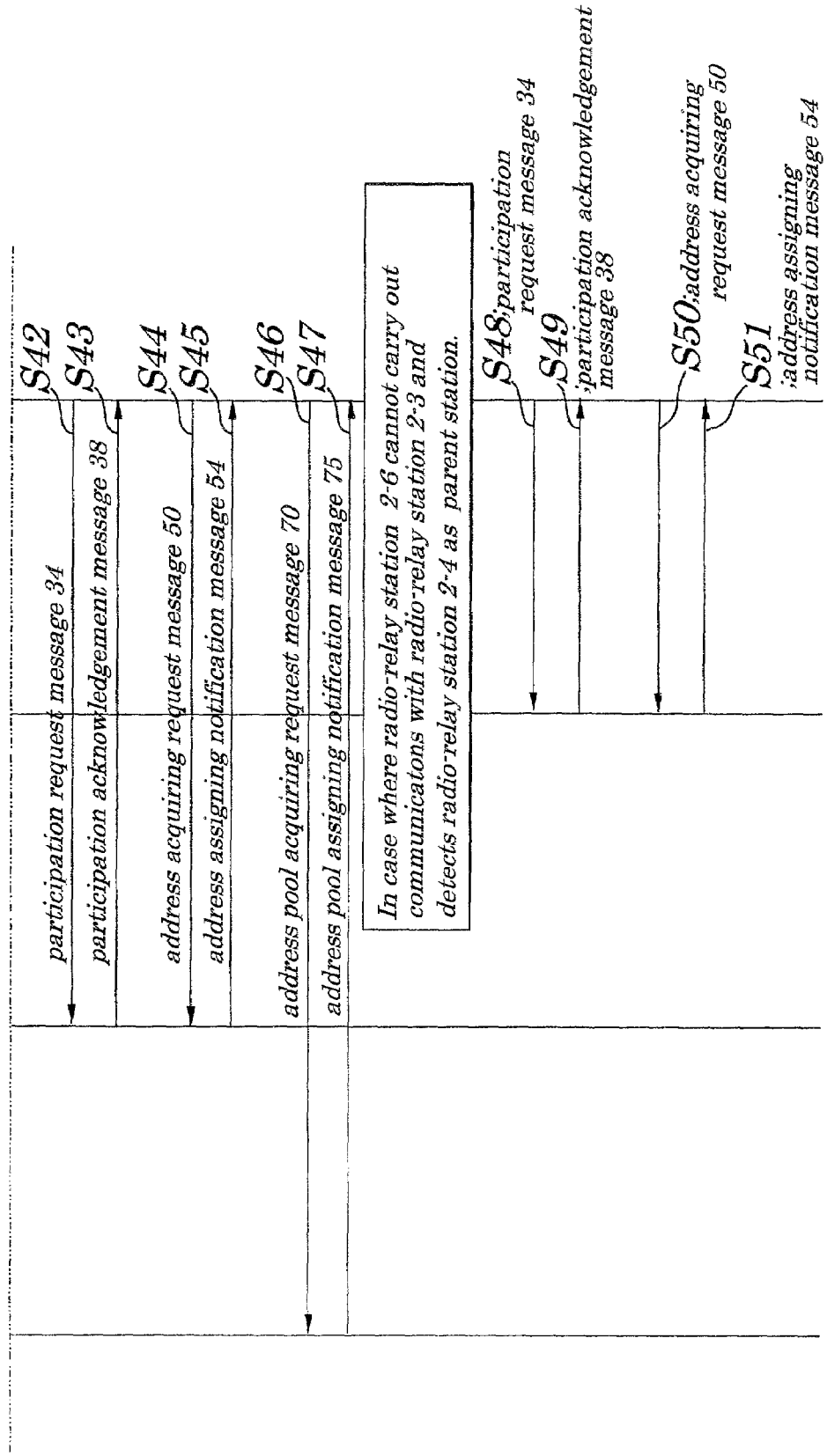
FIG. 19 is another continued diagram showing operations performed when communication between two communication devices making up the wireless network system of the embodiment becomes impossible.

FIGS. 18 and 19 are diagrams showing operations performed when communication between the radio-relay station 2-3 and the radio-relay station 2-6 becomes impossible. The radio-relay station 2-3, in response to the wireless control signal message 30 transmitted from the radio-relay terminating station 1, transmits the participation request message 34 to the radio-relay terminating station 1 (Step S30). The radio-relay terminating station 1, in response to the participation request message 34, transmits the participation acknowledgment message 38 to the radio-relay station 2-3 (Step S31). By such exchange of messages, the radio-relay terminating station 1 serving as the parent station can carry out communications with the radio-relay station 2-3 serving as the child station.

The radio-relay station 2-3 transmits the address acquiring request message 50 to the radio-relay terminating station 1 (Step S32). The radio-relay terminating station 1, in response to the address acquiring request message 50, transmits the address assigning notification message 54 to the radio-relay station 2-3 (Step S33). The radio-relay station 2-3 receives the address assigning notification message 54 and acquires its network address.

The radio-relay station 2-3 transmits the address pool acquiring request message 70 to the radio-relay terminating station 1 (Step S34). The radio-relay terminating station 1, in response to the address pool acquiring request message 70, transmits the address pool assigning notification message 75 to the radio-relay station 2-3 (Step S35). The radio-relay station 2-1 receives the address pool assigning notification message 75, acquires the address pool and transmits, as the parent station, the wireless control signal message 30 over a wireless channel being different from that used by the radio-relay terminating station 1.

When operations of the radio-relay station 2-2 start, the same processing as performed on the radio-relay station 2-3 is performed (Step S30 to S35). That is, the radio-relay station 2-4, in response to the wireless control signal message 30 fed from the radio-relay terminating station 1, transmits the participation request message 34 to the radio-relay terminating station 1 (Step S36). The radio-relay terminating station 1, in response to the participation requests message 34, transmits the participation acknowledgment message 38 to the radio-relay station 2-4 (Step S37). By such exchange of messages, the radio-relay terminating station 1 serving as the parent station can carry out communications with the radio-relay station 2-4 serving as the child station.

The radio-relay station 2-4 transmits the address acquiring request message 50 to the radio-relay terminating station 1 (Step S38). The radio-relay terminating station 1, in response to the address acquiring request message 50, transmits the address assigning notification message 54 to the radio-relay station 2-4 (Step S39). The radio-relay station 2-4 receives the address assigning notification message 54 and acquires its network address.

The radio-relay station 2-4 transmits the address pool acquiring request message 70 to the radio-relay terminating station 1 (Step S40). The radio-relay terminating station 1, in response to the address pool acquiring request message 70, transmits the address pool assigning notification message 75 to the radio-relay station 2-4 (Step S41). The radio-relay station 2-1 receives the address pool assigning notification message 75, acquires the address pool and transmits, as the parent station, the wireless control signal message 30 over the wireless channel being different from that used in the radio-relay terminating station 1.

The radio-relay station 2-6, in response to the wireless control signal message 30 fed from the radio-relay station 2-3, transmits the participation request message 34 to the radio-relay station 2-3 (Step S42). The radio-relay station 2-3, in response to the participation request message 34, transmits the participation acknowledgment message 38 to the radio-relay station 2-6 (Step S43). By such exchange of messages, the radio-relay station 2-3 serving as the parent station can carry out communications with the radio-relay station 2-6 serving as the child station.

The radio-relay station 2-6 transmits the address acquiring request message 50 to the radio-relay station 2-3 (Step S44). The radio-relay station 2-3, in response to the address acquiring request message 50, transmits the address assigning notification message 54 to the radio-relay station 2-6 (Step S45). The radio-relay station 2-6 receives the address assigning notification message 54 and acquires its network address.

The radio-relay station 2-6 transmits the address pool acquiring request message 70 to the radio-relay terminating station 1 (Step S46). The radio-relay terminating station 1, in response to the address pool acquiring request message 70, transmits the address pool assigning notification message 75 to the radio-relay station 2-6 (Step S47). The radio-relay station 2-1 receives the address pool assigning notification message 75, acquires the address pool and transmits the wireless control signal message 30 over a wireless channel being different from that used in the radio-relay terminating station 1.

At this point, when the radio-relay station 2-6 cannot carry out communication with the radio-relay station 2-3, the radio-relay station 2-6 again retrieves the wireless control signal message 30. The radio-relay station 2-6, in response to the wireless control signal message 30 fed from the radio-relay station 2-4, transmits the participation request message 34 to the radio-relay station 2-4 (Step S48). The radio-relay station 2-4, in response to the participation request message 34, transmits the participation acknowledgment message 38 to the radio-relay station 2-6 (Step S49). By such exchange of messages, the radio-relay station 2-4 serving as the parent station can carry out communications with the radio-relay station 2-6 serving as the child station.

The radio-relay station 2-6 transmits the address acquiring request message 50 to the radio-relay station 2-4 (Step S50). The radio-relay station 2-4, in response to the address acquiring request message 50, transmits the address assigning notification message 54 to the radio-relay station 2-6 (Step S51). The radio-relay station 2-6 receives the address assigning notification message 54 and acquires its network address.

The radio-relay station 2-6 compares the network address newly assigned with the network address assigned before and judges whether the wireless network system to which the radio-relay station 2-6 belonged before is the same as, or is different from, the wireless network system to which the radio-relay station 2-6 belongs this time. Such the judgment is carried out by comparing high-order two bytes of the two network addresses and, if its high-order two bytes match with each other, the two wireless network systems are judged to be the same and, if its high-order two bytes do not match with each other, the two wireless network systems are judged to be different from each other.

When the wireless network systems are the same, since the radio-relay station 2-6 has already acquired the address pool obtained from the radio-relay terminating station 1, it is not necessary to acquire the address pool from the radio-relay terminating station 1. As a result, the traffic between the radio-relay station 2-6 and the radio-relay terminating station does not increase.

Figure 20:
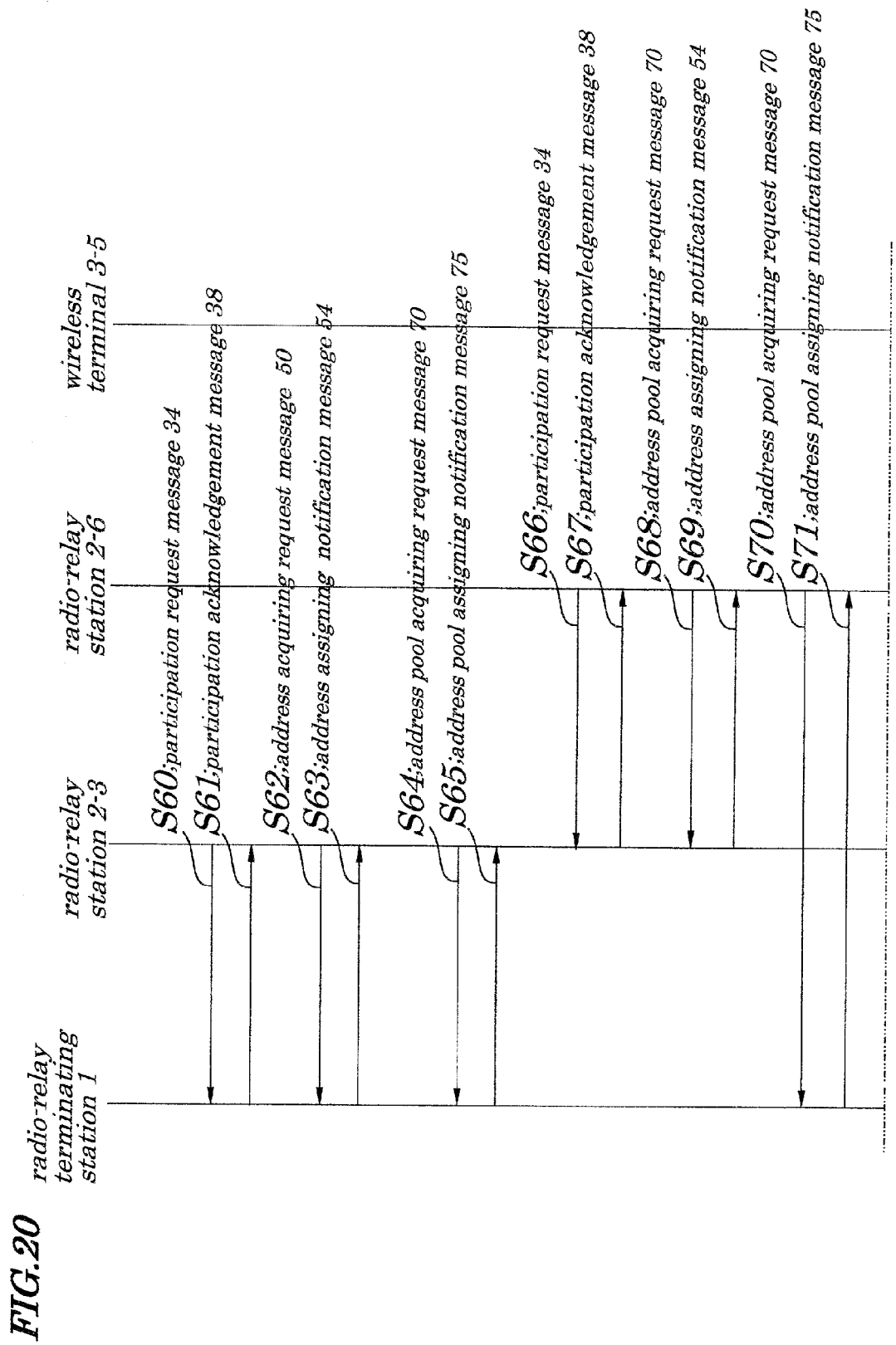
FIG. 20 is a diagram showing operations performed when communication between the radio-relay station and the wireless terminal of the embodiment becomes impossible.
Figure 21:
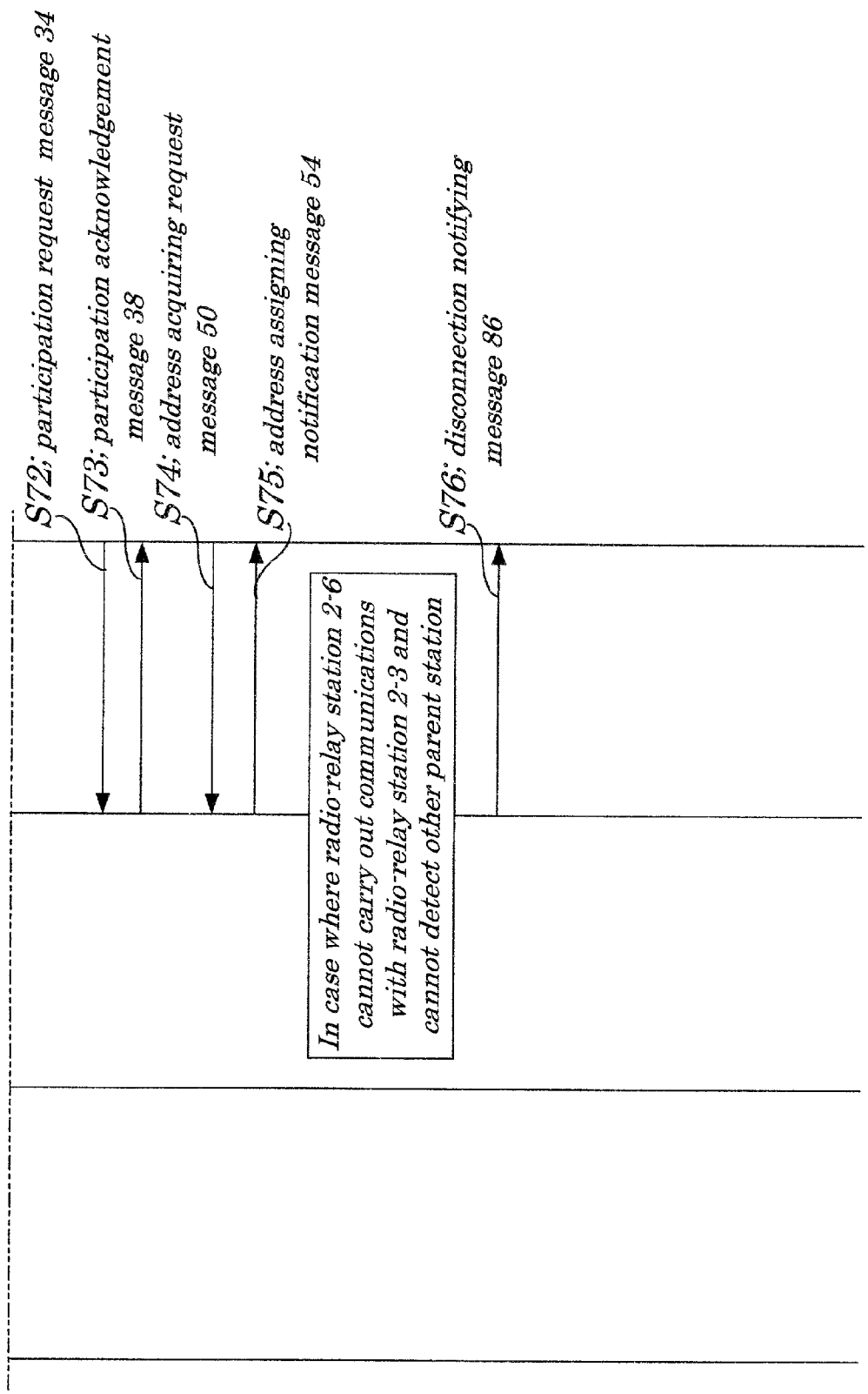
FIG. 21 is another continued diagram showing operations performed when communication between the radio-relay station and the wireless terminal of the embodiment becomes impossible.

FIGS. 20 and 21 are diagrams showing operations performed when communication between the radio-relay station 2-3 and the wireless terminal 3-5 of the embodiment become impossible. The radio-relay station 2-3, in response to the wireless control signal message 30 fed from the radio-relay terminating station 1, transmits the participation request message 34 to the radio-relay terminating station 1 (Step S60). The radio-relay terminating station 1, in response to the participation request message 34, transmits the participation acknowledgment message 38 to the radio-relay station 2-3 (Step S61). By such exchange of messages, the radio-relay terminating station 1 serving as the parent station can carry out communications with the radio-relay station 2-3 serving as the child station.

The radio-relay station 2-3 transmits the address acquiring request message 50 to the radio-relay terminating station 1

(Step S62). The radio-relay terminating station 1, in response to the address acquiring request message 50, transmits the address assigning notification message 54 to the radio-relay station 2-3 (Step S63). The radio-relay station 2-3 receives the address assigning notification message 54 and acquires its network address.

The radio-relay station 2-3 transmits the address pool acquiring request message 70 to the radio-relay terminating station 1 (Step S64). The radio-relay terminating station 1, in response to the address pool acquiring request message 70, transmits the address pool assigning notification message 75 to the radio-relay station 2-3 (Step S65). The radio-relay station 2-1 receives the address pool assigning notification message 75, acquires the address pool and transmits the wireless control signal message 30 over a wireless channel being different from that used in the radio-relay terminating station 1.

The radio-relay station 2-6, in response to the wireless control signal message 30 fed from the radio-relay station 2-3, transmits the participation request message 34 to the radio-relay station 2-3 (Step S66). The radio-relay station 2-3, in response to the participation request message 34, transmits the participation acknowledgment message 38 to the radio-relay station 2-6 (Step S67). By such exchange of messages, the radio-relay station 2-3 serving as the parent station can carry out communications with the radio-relay station 2-6 serving as the child station.

The radio-relay station 2-6 transmits the address pool acquiring request message 70 to the radio-relay station 2-3 (Step S68). The radio-relay station 2-3, in response to the address pool acquiring request message 70, transmits the address assigning notification message 54 to the radio-relay station 2-6 (Step S69) The radio-relay station 2-6 receives the address assigning notification message 54 and acquires its network address.

The radio-relay station 2-6 transmits the address pool acquiring request message 70 to the radio-relay terminating station 1 (Step S70).

The radio-relay terminating station 1, in response to the address pool acquiring request message 70, transmits the address pool assigning notification message 75 to the radio-relay station 2-6 (Step S71). The radio-relay station 2-6 receives the address pool assigning notification message 75, acquires the address pool and transmits, as the parent station, the wireless control signal message 30 over a wireless channel being different from that used in the radio-relay terminating station 1.

The wireless terminal 3-5, in response to the wireless control signal message 30 fed from the radio-relay station 2-6, transmits the participation request message 34 to the radio-relay station 2-6 (Step S72). The radio-relay station 2-6, in response to the participation request message 34, transmits the participation acknowledgment message 38 to the wireless terminal 3-5 (Step S73). By such exchange of messages, the radio-relay station 2-6 serving as the parent station can carry out communications with the wireless terminal 3-5 serving as the child station.

The wireless terminal 3-5 transmits the address acquiring request message 50 to the radio-relay station 2-6 (Step S74). The radio-relay station 2-6, in response to the address acquiring request message 50, transmits the address assigning notification message 54 to the wireless terminal 3-5 (Step S75). The wireless terminal 3-5 receives the address assigning notification message 54 and acquires its network address.

At this point, when the radio-relay station 2-6 cannot carry out communication with the radio-relay station 2-3, the radio-relay station 2-6 again retrieves the wireless control signal message 30. The radio-relay station 2-6, when being unable to find the parent station, transmits the disconnection notifying message 86 to the wireless terminal 3-5 (Step S76). The wireless terminal 3-5, in response to the disconnection notifying message 86, discards the assigned network address and again searches for the parent station.

Moreover, the radio-relay station 2-1, when having received the disconnection notification message 76, discards the network address assigned to the radio-relay station 2-1, transmits the disconnection notifying message 86 to the child station, discards the address pool assigned to the radio-relay station 2-1 and again searches for the parent station. When the address assigned period 80 of the discarded address pool expires, the radio-relay terminating station 1 re-uses the address pool to assign it to the child parent.

By the transmission of such the disconnection notifying message 86, the child station recognizes that it cannot carry out communications with the radio-relay station and can search for another parent station promptly and smoothly. Since the address pool has the address assigned period 80, when the radio-relay station cannot carry out communications with the radio-relay station, the network address that is not used can be assigned to another radio-relay station.

Figure 22:
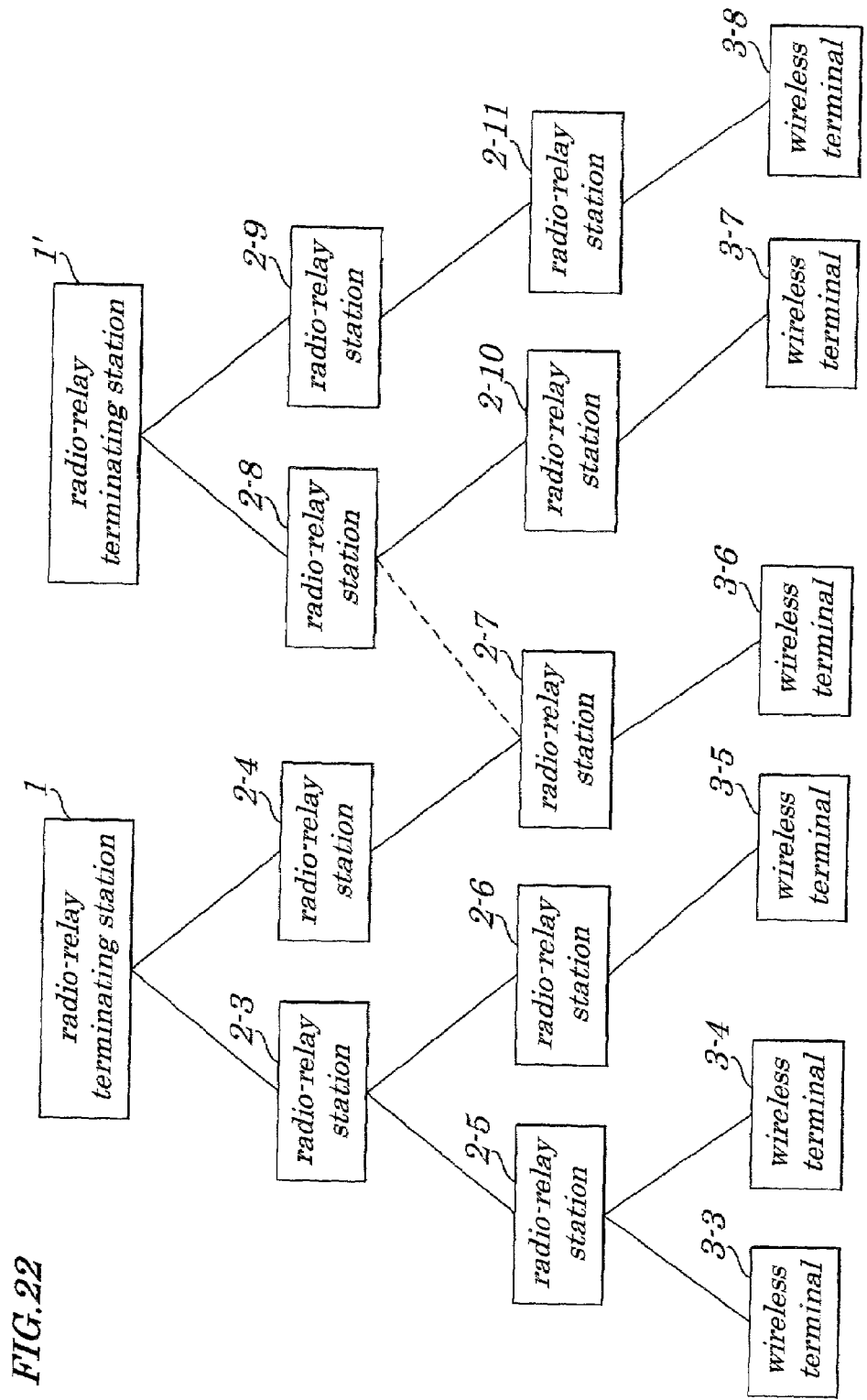
FIG. 22 is a block diagram showing another example of the wireless network system according to the embodiment of the present invention.

FIG. 22 is a block diagram showing still another example of the wireless network system according to the embodiment of the present invention. The radio-relay terminating station 1 is connected to the radio-relay station 2-3 and to the radio-relay station 2-4. The radio-relay station 2-3 is connected to the radio-relay station 2-5 and to the radio-relay station 2-6. The radio-relay station 2-4 is connected to the radio-relay station 2-7. The radio-relay station 2-5 is connected to the wireless terminal 3-3 and to the wireless terminal 3-4. The radio-relay station 2-6 is connected to the wireless terminal 3-6. The radio-relay station 2-7 is connected to the wireless terminal 3-6.

The radio-relay terminating station 1' is connected to the radio-relay station 2-8 and to the radio-relay station 2-9. The radio-relay station 2-8 is connected to the radio-relay station 2-10. The radio-relay station 2-9 is connected to the radio-relay station 2-11. The radio-relay station 2-10 is connected to the wireless terminal 3-7. The radio-relay station 2-11 is connected to the wireless terminal 3-8.

In the wireless network system made up of the radio-relay terminating station 1, a network address 10.1.0.0/16 with high-order two bytes being fixed is set. In the wireless network system made up of the radio-relay terminating station 1', a network address 10.2.0.0/16 with high-order two bytes being fixed is set.

Figure 23:
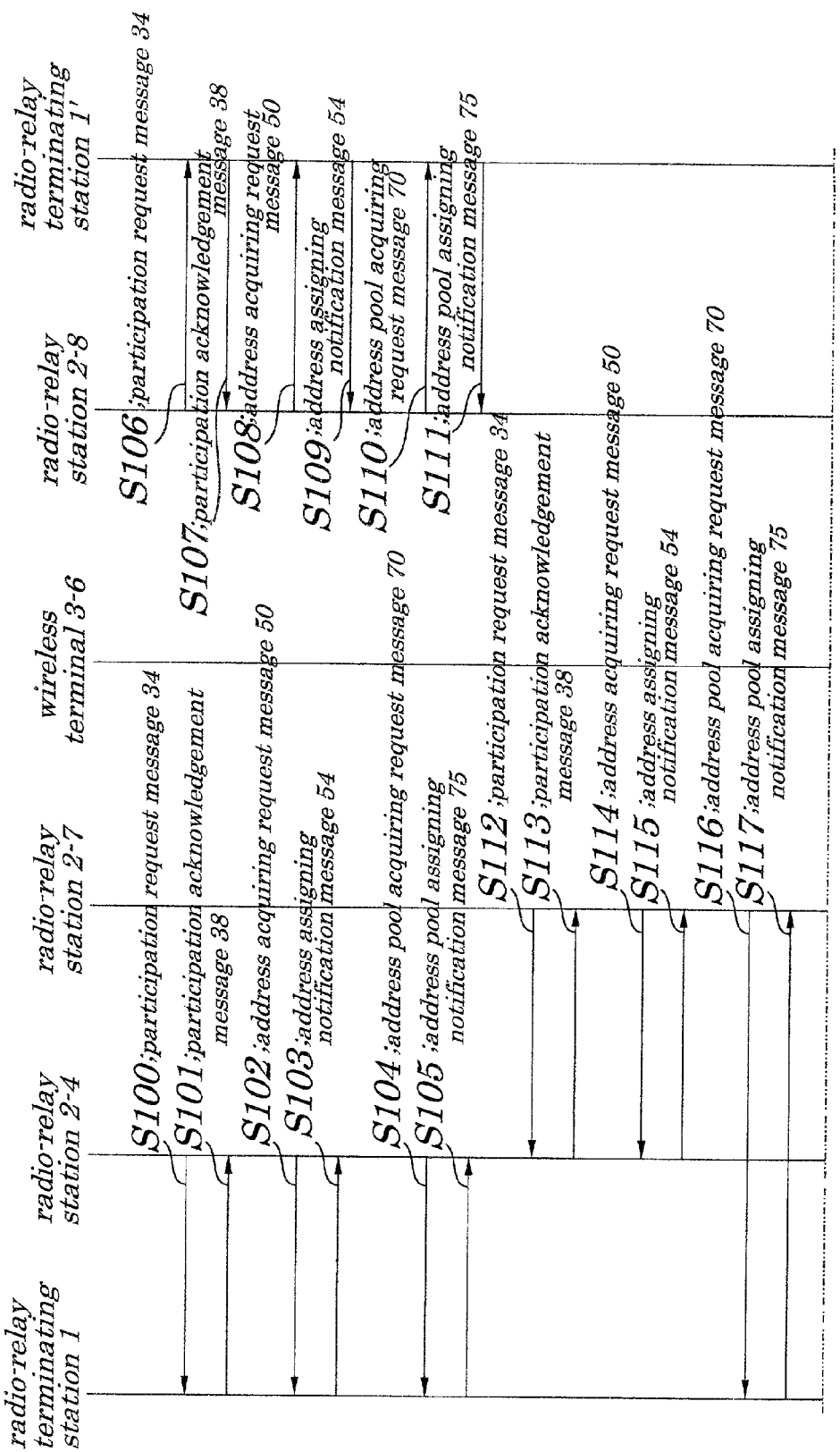
FIG. 23 is a diagram showing operations performed when communication between two radio-relay stations of the embodiment becomes impossible.
Figure 24:
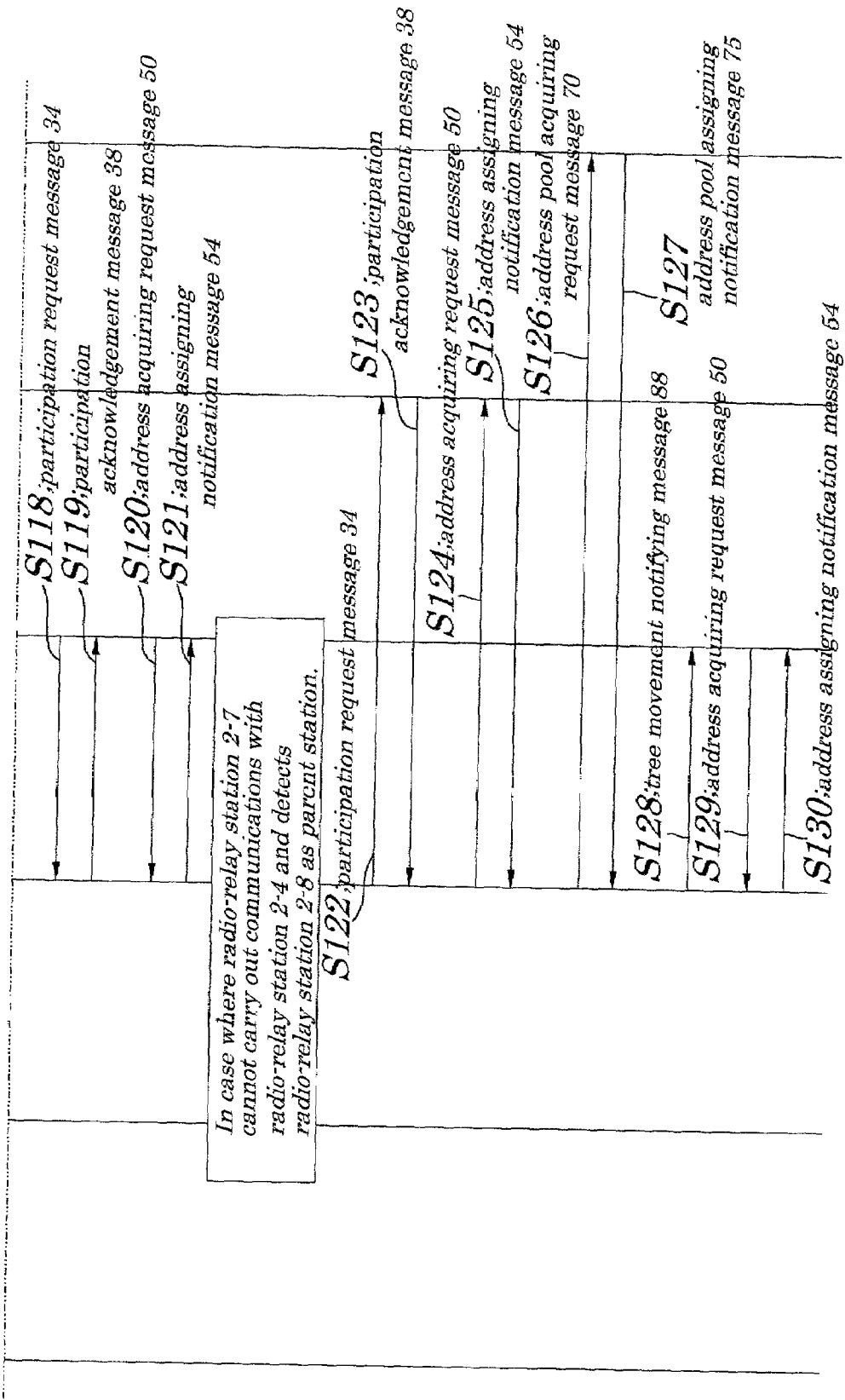
FIG. 24 is another continued diagram showing operations performed when communication between the two radio-relay stations of the embodiment becomes impossible.
Figure 25:
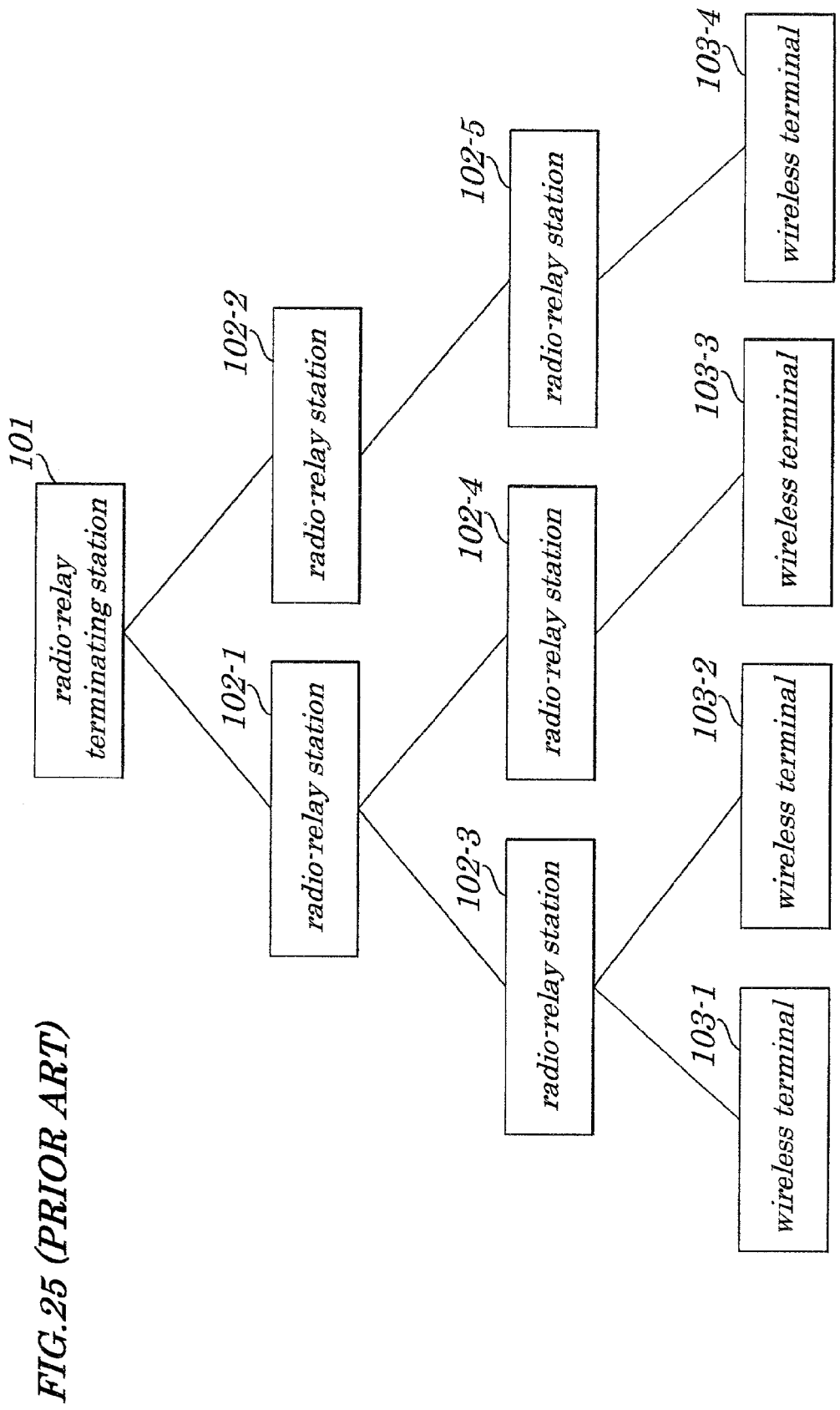
FIG. 25 is a schematic block diagram showing a known conventional wireless network system.

FIGS. 23 and 24 are diagrams showing operations performed when communication between the radio-relay stations 2-4 and the radio-relay station 2-7 of she embodiment becomes impossible. The radio-relay station 2-4, at an initial stage, in response to the wireless control signal message 30 fed from the radio-relay terminating station 1, transmits the participation request message 34 to the radio-relay terminating station 1 (Step S100). The radio-relay terminating station 1, in response to the participation request message 34, transmits the participation acknowledgment message 38 to the radio-relay station 2-4 (Step S101). By such exchange of messages, the radio-relay terminating station 1 serving as the parent station can carry out communications with the radio-relay station 2-4 serving as the child station.

The radio-relay station 2-4 transmits the address acquiring request message 50 to the radio-relay terminating station 1 (Step S102). The radio-relay terminating station 1, in response to the address acquiring request message 50, transmits the address assigning notification message 54 to the radio-relay station 2-4 (Step S103). The radio-relay station 2-4 receives the address assigning notification message 54 and acquires its network address.

The radio-relay station 2-4 transmits the address pool acquiring request message 70 to the radio-relay terminating station 1 (Step S104). The radio-relay terminating station 1, in response to the address pool acquiring request message 70, transmits the address pool assigning notification message 75 to the radio-relay station 2-4 (Step S105). The radio-relay station 2-1 receives the address pool assigning notification message 75, acquires the address pool and transmits, as the parent station, the wireless control signal message 30 over a wireless channel being different from that used in the radio-relay terminating station 1.

The radio-relay station 2-8, in response to the wireless control signal message 30 fed from the radio-relay terminating station 1', transmits the participation request message 34 to the radio-relay terminating station 1' (Step S106). The radio-relay terminating station 1', in response to the participation request message 34, transmits the participation acknowledgment message 38 to the radio-relay station 2-8 (Step S107). By such exchange of messages, the radio-relay terminating station 1' serving as the parent station can carry out communications with the radio-relay station 2-8 serving as the child station.

The radio-relay station 2-8 transmits the address acquiring request message 50 to the radio-relay terminating station 1' (Step S108). The radio-relay terminating station 1', in response to the address acquiring request message 50, transmits the address assigning notification message 54 to the radio-relay station 2-8 (Step S109). The radio-relay station 2-8 receives the address assigning notification message 54 and acquires its network address.

The radio-relay station 2-8 transmits the address pool acquiring request message 7O to the radio-relay terminating station 1' (Step S110). The radio-relay terminating station 1', in response to the address pool acquiring request message 70, transmits the address pool assigning notification message 75 to the radio-relay station 2-8 (Step S111). The radio-relay station 2-1 receives the address pool assigning notification message 75, acquires the address pool and transmits, as the parent station, the wireless control signal message 30 over a wireless channel being different from that used in the radio-relay terminating station 1'.

The radio-relay station 2-7, in response to the wireless control signal message 30 fed from the radio-relay station 24, transmits the participation request message 34 to the radio-relay station 2-4 (Step S112) The radio-relay station 2-4, in response to the participation request message 34, transmits the participation acknowledgment message 38 to the radio-relay station 2-7 (Step S113). By such exchange of messages, the radio-relay station 2-4 serving as the parent station can carry out communications with the radio-relay station 2-1 serving as the child station.

The radio-relay station 2-7 transmits the address acquiring request message 50 to the radio-relay station 2-4 (Step S114). The radio-relay station 2-4, in response to the address acquiring request message 50, transmits the address assigning notification message 54 to the radio-relay station 2-7 (Step S115). The radio-relay station 2-7 receives the address assigning notification message 54 and acquires its network address.

The radio-relay station 2-7 transmits the address pool acquiring request message 70 to the radio-relay terminating station 1 (Step S116). The radio-relay terminating station 1, in response to the address pool acquiring request message 70, transmits the address pool assigning notification message 75 to the radio-relay station 2-7 (Step S117). The radio-relay station 2-1 receives the address pool assigning notification message 75, acquires the address pool and transmits, is the parent station, the wireless control signal message 30 over a wireless channel being different from that used in the radio-relay terminating station 1.

The wireless terminal 3-6, in response to the wireless control signal message 30 fed from the radio-relay station 2-7, transmits the participation request message 34 to the radio-relay station 2-7 (Step S118). The radio-relay station 2-7, in response to the participation request message 34, transmits the participation acknowledgment message 38 to the wireless terminal 3-6 (Step S119). By such exchange of messages, the radio-relay station 2-7 serving as the parent station can carry out communications with the wireless terminal 3-6 serving as the child station.

The wireless terminal 3-6 transmits the address acquiring request message 50 to the radio-relay station 2-7 (Step S120). The radio-relay station 2-7, in response to the address acquiring request message 50, transmits the address assigning notification message 54 to the wireless terminal 3-6 (Step S121). The wireless terminal 3-6 receives the address assigning notification message 54 and acquires its network address.

At this point, when the radio-relay station 2-7 cannot carry out communications with the radio-relay station 2-4, the radio-relay station 2-7 again retrieves the wireless control signal message 30. The radio-relay station 2-7, when having received the wireless control signal message 30 fed from the radio-relay station 2-8, transmits the participation request message 34 to the radio-relay station 2-8 (Step S122). The radio-relay station 2-8, in response to the participation request message 34 fed from the radio-relay station 2-7, transmits the participation acknowledgment message 38 to the radio-relay station 2-7 (Step S123). By such exchange of messages, the radio-relay station 2-8 serving as the parent station can carry out communications with the radio-relay station 2-7 serving as the child station.

The radio-relay station 2-7 transmits the address acquiring request message 50 to the radio-relay station 2-8 (Step S124). The radio-relay station 2-8, in response to the address acquiring request message 50 fed from the radio-relay station 2-7, transmits the address assigning notification message 54 to the radio-relay station 2-7 (Step S125). The radio-relay station 2-7 receives the address assigning notification message 54 fed from the radio-relay station 2-8 and acquires its network address.

The radio-relay station 2-7, by comparing the network address assigned newly with the network address assigned before, judges whether the wireless network system to which the radio-relay station 2-7 belonged before is the same as or different from the wireless network system to which the radio-relay station 2-7 belongs this time. When the wireless network system is different, the radio-relay station 2-7 makes a request of the radio-relay station making up the wireless network system for the address pool. That is, the radio-relay station 2-7 transmits the address pool acquiring request message 70 to the radio-relay terminating station 1' (Step S126)

The radio-relay terminating station 1', in response to the address pool acquiring request message 70, transmits the address assigning notification message 75 to the radio-relay station 2-7 (Step S127). The radio-relay station 2-1 receives the address pool assigning notification message 75, acquires the address pool and transmits the tree movement notifying message 88 to all the child stations (Step S128).

The wireless terminal 3-6, in response to the tree movement notifying message 88 fed from the radio-relay station 2-7, discards the network address assigned to the radio-relay station 2-7 and transmits the address acquiring request message 50 to the radio-relay station 2-7 (Step S129). The radio-relay station 2-7, in response to the address acquiring request message 50 fed from the wireless terminal 3-6, transmits the address assigning notification message 54 to the wireless terminal 3-6 (Step S130).

The radio-relay station 2-i, when having received the tree movement notifying message 88, discards the network address assigned to the radio-relay station 2-i, transmits the address acquiring request message 50 to the parent station to acquire the network address. The radio-relay station 2-i further transmits the movement notifying message 80 to the child station, discards the address pool assigned to the radio-relay station, transmits the address pool acquiring request message 70 to the radio-relay terminating station 1' to acquire the address pool again.

It is apparent that the present invention is not limited to the above embodiments but may be changed and modified without departing from the scope and spirit of the invention.

What is claimed is:

1. A wireless network system comprising:
    a first radio-relay terminating station;
    a first radio-relay station being connected to said first radio-relay terminating station in a wireless manner;
    a wireless terminal being connected to said first radio-relay station in a wireless manner; and
    wherein said first radio-relay terminating station preserves a plurality of network addresses to be assigned to said first radio-relay station and to said wireless terminal, assigns a first network address belonging to said plurality of network addresses to said first radio-relay station and collectively feeds a first address pool making up a part of said plurality of network addresses to the first radio-relay station and wherein said first radio-relay station preserves said first address pool and assigns a second network address belonging to said first address pool to said wireless terminal.

2. The wireless network system according to claim 1, further comprising a second radio-relay station, wherein said second radio-relay station preserves a second address pool being different from said first address pool and wherein, when said first radio-relay station is connected to said second radio-relay station, said second radio-relay station assigns a third network address belonging to said second address pool to said first radio-relay station.

3. The wireless network system according to claim 2, wherein, when said second radio-relay station is connected to said first radio-relay terminating station, said second address pool makes up of a part of said plurality of network addresses and said first address pool is not updated and said second network address is not updated.

4. The wireless network system according to claim 2, further comprising second radio-relay terminating station which preserves a second plurality of network addresses being different from said plurality of network addresses and wherein, when said second radio-relay station is connected to said second radio-relay terminating station, said first address pool is updated to become still a third address pool making up a part of said other plurality of network addresses and said second network address is updated to become a fourth network address belonging to said third address pool.

5. A network address assigning method for assigning a network address to a first radio-relay station and a wireless terminal in a wireless network system made up of a first radio-relay terminating station, said first radio-relay station, and said wireless terminal, said method comprising:
    a step of feeding a plurality of network addresses to said first radio-relay terminating station;
    a step of assigning a first network address belonging to said plurality of network addresses to said first radio-relay station being connected to said first radio-relay terminating station in a wireless manner;
    a step of notifying said first radio-relay station being connected to said first radio-relay terminating station in said wireless manner of a first address pool making up a part of said plurality of network addresses; and
    a step of assigning a second network address belonging to said first address pool to said wireless terminal being connected to said first radio-relay station in a wireless manner.

6. The network address assigning method according to claim 5, wherein said wireless network system includes a second radio-relay station having a second address pool being different from said first address pool and wherein, when said first radio-relay station is connected to said second radio-relay station, a third network address belonging to said second address pool is assigned to said first radio-relay station.

7. The network address assigning method according to claim 6, wherein, when said second radio-relay station is connected to said radio-relay terminating station, said second address pool makes up said plurality of network addresses and said first address pool is not updated and said second network address is not updated.

8. The network address assigning method according to claim 6, wherein said wireless network system includes a second radio-relay terminating station and wherein, when said second radio-relay station is connected to said second radio-relay terminating station, said network address assigning method comprises:
    a step of feeding a second plurality of network addresses being different from said plurality of network addresses to said second radio-relay terminating station;
    a step of notifying said second radio-relay station of a fourth address pool making up a part of said other plurality of network addresses;
    a step of notifying said first radio-relay station of a third address pool making up another part of said other plurality of network addresses via said second radio-relay station; and
    a step of assigning a fourth network address belonging to said third address pool to said wireless terminal.

9. The network address assigning method according to claim 8, wherein each of said network addresses contains a value corresponding to one of the radio-relay terminating station and wherein, when said value belonging to said first network address is different from said value belonging to said third network address, still said third address pool is notified.

* * * * *